(12) United States Patent
Jacob et al.

(10) Patent No.: US 9,118,377 B2
(45) Date of Patent: Aug. 25, 2015

(54) METHOD FOR INTERFERENCE AND CARRIER POWER ESTIMATION AND ITS APPLICATION TO AUTOMATIC GAIN CONTROL AND SIGNAL-TO-INTERFERENCE-AND-NOISE-RATIO COMPUTATION

(75) Inventors: Naveen Jacob, Kerala (IN); Sajal Kumar Das, Kolkata (IN); Ravi Jandial, Bangalore (IN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 35 days.

(21) Appl. No.: 13/542,168

(22) Filed: Jul. 5, 2012

(65) Prior Publication Data

US 2014/0010267 A1    Jan. 9, 2014

(51) Int. Cl.
*H04B 1/38* (2006.01)
*H04B 1/10* (2006.01)
*H04L 1/20* (2006.01)

(52) U.S. Cl.
CPC ............... *H04B 1/1027* (2013.01); *H04L 1/20* (2013.01)

(58) Field of Classification Search
CPC .............. H04L 5/0037; H04L 25/0232; H04L 25/03006; H04L 1/0026; H04L 25/03834; H04L 25/03299; H04W 72/085; H04W 72/08; H04W 72/082; H04W 40/12; H04W 52/52; H04B 17/0057; H04B 17/005; H04H 20/30
USPC ......... 375/219, 224, 227, 260, 284, 295, 316, 375/384
See application file for complete search history.

(56) References Cited

U.S. PATENT DOCUMENTS 7,477,658 B2 *  1/2009  Gu ................................ 370/468
8,331,865 B2 * 12/2012  Ruelke et al. ................ 455/63.1

(Continued)

FOREIGN PATENT DOCUMENTS

EP          1612652 A1     1/2006
WO      2006/027603 A1     3/2006

OTHER PUBLICATIONS

3rd Generation Partnership Project (3GPP); "3rd Generation Partnership Project; Technical Specification Group GSM/EDGE Radio Access Network Digital cellular telecommunications system (Phase 2+); Mobile Station (MS) conformance specification; Part 1: Conformance specification (Release 8)"; 3GPP TS 51.010-1 V8.2.0; Technical Specification; Jun. 2009; pp. 453-465; Valbonne, France.

(Continued)

*Primary Examiner* — Dhaval Patel
(74) *Attorney, Agent, or Firm* — Patent Portfolio Builders PLLC

(57) ABSTRACT

A system and method are provided for estimating interference power at a receiver antenna in a communications systems receiver, in which an interference type signal associated with a received radio signal is detected, an in-band interference power associated with the received radio signal is determined, and an interference power at the antenna is estimated using the determined in-band interference power and the detected interference type. Estimating the interference power at the antenna includes interpolating the determined in-band interference power using scaling factors determined by the interference type signal associated with the received radio signal. The system and method determine in-band carrier power associated with the radio signal based on a channel estimate h(k), and the in-band interference information is based on interference samples I(n). In addition, an average total power, automatic gain control (AGC) setting, and signal-to-information-and-noise ratio can be determined by the system and method.

27 Claims, 10 Drawing Sheets

(56) References Cited

U.S. PATENT DOCUMENTS

| 8,401,507 | B2* | 3/2013 | Hillery et al. ............... 455/296 |
| 2005/0047534 | A1 | 3/2005 | Lindoff et al. |
| 2006/0234660 | A1 | 10/2006 | Kwak |
| 2007/0054642 | A1 | 3/2007 | Bhardwaj et al. |
| 2010/0016012 | A1 | 1/2010 | Valadon |
| 2011/0150154 | A1 | 6/2011 | Chen |

OTHER PUBLICATIONS

Martinez G. Isaac; "Automatic Gain Control (AGC) circuits, Theory and design"; ECE1352 Analog Integrated Circuits I, Term Paper; University of Toronto; Fall 2001; pp. I-XXV.

Tim Fingscheidt, et al.; "Softbit Speech Decoding: A New Approach to Error Concealment"; IEEE Transactions on Speech and Audio Processing; vol. 9, No. 3; Mar. 2001; pp. 240-251; Munich, Germany.

National Technology & Science Press; "Chapter 1, Circuit Terminology"; pp. 2-8, 10-12 and 20-21; 2009.

International Search Report in corresponding International Application No. PCT/EP2013/062601 mailed Sep. 3, 2013.

Written Opinion in corresponding International Application No. PCT/EP2013/062601 mailed Sep. 3, 2013.

Stephen A. Dyer, et al.; "Least-Squares Fitting of Data by Polynomials"; IEEE Instrumentation & Measurement Magazine, vol. 4, No. 4; Dec. 1, 2001; pp. 46-51.

International Preliminary Report on Patentability issued in corresponding International application No. PCT/EP2013/062601, date of issuance of the report Jan. 6, 2015.

* cited by examiner

METHOD FOR INTERFERENCE AND CARRIER POWER ESTIMATION AND ITS APPLICATION TO AUTOMATIC GAIN CONTROL AND SIGNAL-TO-INTERFERENCE-AND-NOISE-RATIO COMPUTATION

TECHNICAL FIELD

The present invention relates generally to communications systems, and more specifically to systems and methods for estimating interference and carrier power at an antenna in user equipment for improving automatic gain control settings, signal-to-interference-and-noise-ratio, among other uses.

BACKGROUND

Referring to FIGS. 1 and 2, a conventional multiuser wireless (wireless) system 100 is shown as well as user equipment 200. Wireless system 100 includes first transmission cell area (cell area) 10a, and second cell area 10b, though, as one of ordinary skill in the art can appreciate, there are normally many more cells in a conventional wireless system 100. In the wireless system 100, first and second user equipment 4a and 4b include transmit antennas 6a and 6b respectively, as well as receive antennas 8a and 8b, respectively. First cell tower 2a transmits first desired transmitted signal 202a to first user (mobile station (MS)) 4a, and second desired transmitted signal 202b to MS 4b. In addition, first cell tower (base station (BS)) 2a receives first desired received signal 204a from first MS 4a, and second desired received signal 204b from second MS 4b. Second BS 2b, in second cell 10b, transmits third desired transmitted signal 202c to third user 4c, and receives third desired received signal 204c from third MS 4c. The nomenclature "desired" refers to those signals that are meant to be received by the particular user equipment, and do not include, as shown in FIG. 1, un-desired signals that can include, among other types, co-channel interference (CCI) signals 14 and adjacent channel interference (ACI) signals 12. From here-on in, the signals transmitted by, and received at user equipment 4 shall be simply referred to as "transmitted signal 202" and "received signal 204."

As is well known, many different signals impinge upon receive antennas 8a,b, including both desired signals (received signals 204a,b) and signals that are not desired, the above referenced interference signals. All of the received signals combine to form a composite signal 206 (shown in FIG. 2). Composite signal 206 is received by receive antenna 8 (although shown as two separate antennas in FIG. 1, for convenience, those of ordinary skill in the art can appreciate that transmit and receive functions can be performed by a single antenna, as shown in FIG. 2) undergoes down-conversion in RF front end 208, and various stages of decimation and low-pass filtering in the RF before it is available at baseband block 214 (i.e., RF front end 208 down converts the RF signals to an intermediate frequency (IF), which is then received at IF block 210, and the intermediate down-converted received signal is sent to back end block 212, which outputs a baseband signal (i.e., voice, data, video). Due to the low-pass filtering of composite signal 206, the interference signals 12, 14 at antenna(s) 6, 8 are filtered out before reaching the baseband frequency range. The elimination of the interference signals, however, presents a problem for many applications such as automatic gain control (AGC), and determination of the signal-to-interference and noise (SINR) computations, among others, where an accurate computation and/or estimation of the carrier and interference power at the receive antenna 8 is necessary.

In multi-user scenarios, the interference environment can be broadly classified into three categories: sensitivity, co-channel interference (CCI), adjacent channel interference (ACI). In the sensitivity scenario, the input signal is mainly influenced by additive white Gaussian noise (WGN) and the contribution from interference is absent. In the CCI scenario, the interference is from a cell using the same frequency as the input/desired signal. Referring back to FIG. 1, CCI signal 14 could be generated from third MS 4c that is operating on channel 1, which is the same channel that first MS 4a is operating on. The third category of interference is ACI, in which case the interference is due to leakage of power from an adjacent user equipment whose operating channel is close in frequency to the first user equipment. That is, referring to FIG. 1, ACI signal 12 results from second MS 4b operating on channel 2 that is relative close in frequency to channel 1 used by first MS 4a, and wherein, typically, second MS 4b is probably operating in close physical proximity to first MS 4a.

As discussed above, determination of the power of interference signals is useful for AGC and SINR determination. A brief discussion of the determination of both is relevant for the purposes of this disclosure.

Automatic Gain Control

The total power received in the antenna terminal is the sum of desired carrier power and all the interferer signals power.

$$\text{Total Power at Antenna Input} = \text{Carrier Power } C + \sum_{k} k^{th} \text{ Interferer Power } (I_k) + wgn, \quad \text{(Eq. 1)}$$

where wgn is white Gaussian noise.

The received total power at antenna input is input to lower noise amplifier (LNA), as shown in FIG. 2. The gain of LNA 216 is set according to the average received signal strength indicator (RSSI), as computed by the AGC algorithm. The gain determined by the AGC algorithm needs to be set appropriately to avoid as much saturation or clipping of the input signal as possible, while simultaneously ensuring that the received signal is amplified to an optimum level to improve the sensitivity level. Therefore appropriate and fast gain control is very important for receiver signal processing.

SINR Computation

The radio link quality is directly influenced by the amount of interference signal present in the received signal. The greater the amount of interference power present in the received signal, the poorer is the receiver bit error rate (BER) performance. Therefore, there is a need to estimate the proper ratio of carrier-to-interferer (C/I) power.

The SINR is defined as:

$$SINR = \frac{\text{Carrier Power}}{\text{Interference Power} + \text{Noise Power}}. \quad \text{(Eq. 2)}$$

In a receiver, the SINR is used for various applications, such as equalizers, radio link adaptation, AMR codec rate adaptation, and burst validity checks. Equalizers with different computational complexity can be used based on the estimated SINR. For example, if it can be determined that the SINR is expected to be good (i.e., relatively high), then a low complexity equalizer (e.g., an equalizer that uses only a single antenna) can be used to obtain the desired performance. If, however, it can be determined that the SINR is expected to be poor (i.e., relatively low), a more computationally intensive equalizer (e.g., a multiple antenna equalizer) can be used to obtain better performance.

In radio link adaption, the mobile station (MS) forwards the estimated SINR to the base station (BS), wherein the BS then adjusts the modulation and coding schemes to adjust the data rate accordingly. If the SINR is predicted to be high, a higher data rate can be expected, and if the SINR is expected to be lower, then the data rate is adjusted downward, accordingly.

In global system for mobile communications (GSM) systems, the adaptive multi-user rate (AMR) audio codec rate is adjusted according to the estimated SINR. As known by those of ordinary skill in the art, AMR audio codec is an audio data compression scheme optimized for speech coding. AMR uses link adaptation to select from one of eight different bit rates based on link conditions. AMR utilizes different speech coding techniques depending on circumstances and/or system design. When AMR is implemented, an optimized link adaptation is used to select the best codec mode to meet the local radio channel and capacity requirements. For example, if the radio channel between the BS and the MS is experiencing higher than normal noise (i.e., decreased SINR), source coding is reduced and channel coding is increased. This has the effect of improving the quality and robustness of the network connection, but some voice clarity is sacrificed. Conversely, if radio channel conditions improve, i.e., a high SINR, then source coding can be increased and channel coding decreased.

In order to achieve higher data transmission rates (DTR), the condition of the radio channel between the BS and the MS should be at least at some nominal, or threshold level to ensure that the higher DTR can be accomplished. Therefore, the SINR value is used to indicate the validity of the received burst by comparing the SINR with a threshold value. If the SINR is equal or greater than the threshold, then the burst transmission can be presumed to be validly received.

For at least the reasons discussed above, it is important to estimate the SINR accurately in different channel conditions and environments taking all the factors into consideration for proper receiver operation. Unfortunately, currently employed systems and methods fail to adequately achieve accurate SINR estimations.

As discussed above, the proper estimation of interference power is important to estimate the total power and to estimate the SINR. There are various baseband algorithms/methods available and employed in the receiver to estimate the interference power. They suffer from problems that are described below, in conjunction with AGC and SINR estimation.

As briefly discussed above, the determination of the AGC setting involved a determination of the SINR. In current use, many receivers estimate the total received power using the received signal strength indicator (RSSI) that is computed as:

$$RSSI = \sum_m I(m)^2 + Q(m)^2, \quad \text{(Eq. 3)}$$

wherein m is the number of complex (I,Q) samples in the received frame/burst. For example, in GSM, the number of complex samples is 156. Based on the RSSI value, an appropriate gain is selected for the received signal attenuation/amplification. But, when the composite signal passes through the RF front-end circuit, some of the signal is filtered out (low pass filtering) and attenuated by the RF circuit. This is not directly visible in the baseband where RSSI is computed. If there are strong ACI signals present in the input signal, then a major part of that would be filtered out by the RF low pass filters due to which the estimated in-band RSSI in the baseband would be much lower than the true RSSI at the antenna. This can lead to incorrect AGC gain being applied leading to undesirable effects like saturation or analog-to-digital converter (ADC) clipping that can severely degrade the receiver performance.

When performing SINR estimation, interference is normally estimated based on either pilot/training symbols or data symbols. Since the interference power reaching the baseband is already filtered out or attenuated by the RF block, the estimated interference power is often inaccurate leading to incorrect SINR estimation.

In many GSM receivers the SINR is also estimated using the soft-bit quality (SFQ). A significant issue in this approach is that in the high and low SINR region, the SFQ based SINR saturates. That is, the estimated SINR does not change even though the actual SINR at the antenna changes. No differentiation of SINR value is noticeable in these regions (high and low) and hence SINR cannot be calculated accurately for the high and low SINR regions.

Accordingly, it would be desirable to provide methods, modes and systems for accurately and effectively determining carrier and interference powers at the antenna before signal processing can alter the fundamental nature of the received signal irretrievably.

SUMMARY

It is therefore a general aspect of the invention to provide a transceiver that will obviate or minimize problems of the type previously described.

According to a first aspect of the present invention, a method is provided for estimating interference power at a receiver antenna in a communications systems receiver, the method comprising detecting an interference type signal associated with a received radio signal, determining an in-band interference power associated with the received radio signal, and estimating an interference power at the antenna using the determined in-band interference power and the detected interference type. According to the first aspect, the step of estimating the interference power at the antenna comprises interpolating the determined in-band interference power using scaling factors determined by the interference type signal associated with the received radio signal. According to the first aspect, the method further comprises determining in-band carrier power associated with the radio signal based on a channel estimate h(k), and further wherein the in-band interference information is based on interference samples I(n), determining an average total power for the communications systems receiver; and determining an automatic gain control (AGC) setting based on the determined average total power.

According to the first aspect, the step of determining the average total power for the communications systems receiver comprises determining an averaged carrier power and an averaged interference power, wherein the averaged carrier power is based on an instantaneous carrier power value, and the averaged interference power is based on an instantaneous interference power value, and summing the averaged carrier power and the averaged interference power to obtain the average total power for the communications systems receiver.

According to the first aspect, the method further comprises determining a signal-to-noise-plus-interference ratio (SINR), wherein the SINR is equal to the ratio of the average carrier power to the average interference power, and selecting, in a mobile station in a communications system a RF filter based on the determined SINR, wherein a wideband RF filter is selected in the mobile station when the interference type is one of the sensitivity and co-channel interference types and wherein the wideband RF filter has a bandwidth at least greater than an application specific bandwidth, and further wherein a narrowband RF filter is selected in the mobile station when the interference type is the adjacent channel interference type and wherein the narrowband RF filter has a bandwidth less than the application specific bandwidth.

According to the first aspect, the method further comprises selecting an equalizer in a mobile station in a communications network based on the determined interference type, wherein when the interference type is the sensitivity interference type, using a [low complexity] single antenna equalizer that optimizes SINR performance under thermal noise and no interference conditions in the mobile station, and wherein when the interference type is one of the co-channel interference type and adjacent channel interference type, using an interference cancellation equalizer. According to the first aspect, the single antenna equalizer can be a low complexity single antenna temporal whitening equalizer when the interference type is the sensitivity type of interference. Still further according to the first aspect, the interference cancellation equalizer can be an equalizer based on an interference rejection combining (IRC) technique or an ST-IRC equalizer, and the interference cancellation equalizer can use a single antenna or multiple antennas. According to the first aspect, the instantaneous values of the interference and carrier powers are equal to the in-band interference power and in-band carrier power, respectively.

According to the first aspect, the step of detecting an interference type signal associated with the radio signal comprises determining a power residue value of sensitivity type interference, determining a power residue value of cross channel interference (CCI) type interference, determining a power residue value of adjacent channel interference (ACI) type interference, and determining the interference type based on which of the sensitivity, CCI and ACI power residue values is a smallest power residue value.

According to the first aspect, the method further comprises setting a scaling factor $K_I$ equal to $K_{CCI}$ if the interference type is the sensitivity or CCI type, and setting the scaling factor $K_I$ equal to $K_{ACI}$ if the interference type is the ACI type. According to the first aspect, the method further comprises calculating an interference power at the antenna according to the equation $$P_{interference} = K_I \times \text{in-band interference power};$$

and calculating a carrier power at the antenna according to the equation $$P_{Carrier} = K_C \times \text{in-band carrier power},$$

wherein $K_C$ is a carrier power scaling factor. According to the first aspect, the method further comprises determining the cross channel interference scaling factor $K_{CCI}$ by inputting cross channel interference type interference signals into the antenna of the receiver of the communications system at an injected interference power level, calculating in-band interference power from the cross channel interference type interference signals, and determining the cross channel interference scaling factor according to the equation $$K_{CCI} = \frac{\text{injected interference power level at antenna}}{\text{calculated in-band interference power}}.$$

According to the first aspect, the method further comprises determining the adjacent channel interference scaling factor $K_{ACI}$ by inputting adjacent channel interference type interference signals into the antenna of the receiver of the communications system at an injected interference power level, calculating in-band interference power from the adjacent channel interference type interference signals, and determining the adjacent channel interference scaling factor according to the equation $$K_{ACI} = \frac{\text{injected interference power level at antenna}}{\text{calculated in-band interference power}}.$$

According to the first aspect, the method further comprises determining the carrier power scaling factor $K_C$ by injecting a carrier signal of a known power to the antenna of the receiver, such that substantially no interference signals are present other than thermal noise signals, calculating the in-band carrier power using the channel estimate according to the equation $$\text{In-band carrier power} = \sum_{L=0}^{L-1} |h(k)|^2,$$

where $h(k)$ is a channel response, and L is a number of channel taps in the receiver of the communications system, and determining the carrier power scaling factor according to the equation $$K_C = \frac{\text{injected carrier power level at antenna}}{\text{calculated in-band interference power}}.$$

According to the first aspect, the method further comprises calculating a true carrier power at the antenna according to the equation $$\text{true carrier power} = a_n \times EC^n + a_{n-1} \times EC^{n-1} + \ldots + a_1 \times EC + a_0,$$

wherein EC equals an estimated in-band carrier power, calculated according to the equation $$\text{in-band carrier power} = \sum_{L=0}^{L-1} |h(k)|^2,$$

wherein L is a number of channel taps in the receiver of the communications system, and estimating the interference power at the antenna using a method of mapping the determined in-band interference power according to one or more of a method of curve fitting, least square, and linear regression, and further wherein the estimated interference power is dependent upon the detected type of interference signal. According to the first aspect, the step of mapping the determined in-band interference power comprises determining that the detected type of interference signal is one of a CCI and sensitivity type interference signal, and calculating a true interference power at the antenna according to the equation $$\text{True Interference Power(CCI)} = b_{CCI}(n) \times E_I^n + b_{CCI}(n-1) \times E_I^{n-1} + \ldots b_{CCI}(1) \times E_I + b_{CCI}(0),$$

wherein EI equals an estimated in-band interference power, calculated according to the equation $$\text{in-band interference power} = \sum_n |\hat{I}(n)|^2.$$

According to the first aspect, the step of mapping the determined in-band interference power comprises determining that the detected type of interference signal is an ACI type interference signal; and calculating a true interference power at the antenna according to the equation $$\text{True Interference Power(ACI)} = b_{ACI}(n) \times E_I^n + b_{ACI}(n-1) \times E_I^{n-1} + \ldots b_{ACI}(1) \times E_I + b_{ACI}(0),$$

wherein EI equals an estimated in-band interference power, calculated according to the equation $$\text{in-band interference power} = \sum_n |\hat{I}(n)|^2.$$

According to a second aspect of the present invention, a receiver in a communications systems is provided, comprising an antenna configured to transmit radio signals, and to receive radio signals, a radio frequency (RF) module coupled to the antenna, wherein the RF module is configured to up-convert communications signals for transmission by the antenna as transmitted radio signals, and to down-convert radio signals received by the antenna, respectively, and wherein down-conversion includes converting the received radio signals into digital signals representative of the received radio signals, and a digital baseband module, coupled to the RF module, wherein the digital baseband module is configured to receive the digitals signals from the RF module, detect an interference type signal associated with the radio signal, determine an in-band interference power associated with the radio signal, and estimate an interference power at the antenna using the determined in-band interference power and the detected interference type. According to the second aspect, the digital baseband module is further configured to interpolate the determined in-band interference power using scaling factors determined by the interference type signal associated with the radio signal, and the digital baseband module is still further configured to determine in-band carrier power associated with the radio signal based on a channel estimate h(k), and further wherein the in-band interference information is based on interference samples I(n).

According to the second aspect, the digital baseband module is further configured to determine an average total power for the communications systems receiver, and determine an automatic gain control (AGC) setting based on the determined average total power, and to determine an averaged carrier power and an averaged interference power, wherein the averaged carrier power is based on an instantaneous carrier power value, and the averaged interference power is based on an instantaneous interference power value, and the digital baseband module is still further configured to sum the averaged carrier power and the averaged interference power to obtain the average total power for the communications systems receiver.

According to the second aspect, the digital baseband module is further configured to determine a signal-to-noise-plus-interference ratio (SINR), wherein the SINR is equal to the ratio of the average carrier power to the average interference power, and to select, in a mobile station in a communications system, an RF filter based on the determined SINR, wherein a wideband RF filter is selected in the mobile station when the interference type is one of the sensitivity and co-channel interference types and wherein the wideband RF filter has a bandwidth at least greater than an application specific bandwidth, and further wherein a narrowband RF filter is selected in the mobile station when the interference type is the adjacent channel interference type and wherein the narrowband RF filter has a bandwidth less than an application specific bandwidth.

According to the second aspect, the digital baseband module is further configured to select an equalizer in a mobile station in a communications network based on the determined interference type, wherein when the interference type is the sensitivity interference type, using a [low complexity] single antenna equalizer that optimizes SINR performance under thermal noise and no interference conditions in the mobile station, and wherein when the interference type is one of the co-channel interference type and adjacent channel interference type, using an interference cancellation equalizer. According to the second aspect, the single antenna equalizer can be a low complexity single antenna temporal whitening equalizer when the interference type is the sensitivity type of interference, and the interference cancellation equalizer can be an equalizer based on an interference rejection combining (IRC) technique or an ST-IRC equalizer. According to the second aspect, the interference cancellation equalizer can use a single antenna or multiple antennas, and wherein the instantaneous values of the interference and carrier powers are equal to the in-band interference power and in-band carrier power, respectively.

According to the second aspect, the digital baseband module is further configured to determine a power residue value of sensitivity type interference, determine a power residue value of cross channel interference (CCI) type interference, determine a power residue value of adjacent channel interference (ACI) type interference; and determine the interference type based on which of the sensitivity, CCI and ACI power residue values is a smallest power residue value. According to the second aspect, the digital baseband module is further configured to set a scaling factor $K_I$ equal to $K_{CCI}$ if the interference type is the sensitivity or CCI type, and set the scaling factor $K_I$ equal to $K_{ACI}$ if the interference type is the ACI type.

According to the second aspect, the digital baseband module is further configured to calculate an interference power at the antenna according to the equation $$P_{interference} = K_I \times \text{in-band interference power},$$

and calculate a carrier power at the antenna according to the equation $$P_{Carrier} = K_C \times \text{in-band carrier power},$$

wherein $K_C$ is a carrier power scaling factor.

According to the second aspect, the digital baseband module is further configured to determine the cross channel interference scaling factor $K_{CCI}$ by inputting cross channel interference type interference signals into the antenna of the receiver of the communications system at an injected interference power level, calculate in-band interference power from the cross channel interference type interference signals, and determine the cross channel interference scaling factor according to the equation $$K_{CCI} = \frac{\text{injected interference power level at antenna}}{\text{calculated in-band interference power}}.$$

According to the second aspect, the digital baseband module is further configured to determine the adjacent channel interference scaling factor $K_{ACI}$ by inputting adjacent channel interference type interference signals into the antenna of the receiver of the communications system at an injected interference power level, calculate in-band interference power from the adjacent channel interference type interference signals, and determine the adjacent channel interference scaling factor according to the equation $$K_{ACI} = \frac{\text{injected interference power level at antenna}}{\text{calculated in-band interference power}}.$$

According to the second aspect, the digital baseband module is further configured to determine the carrier power scaling factor $K_C$ by injecting a carrier signal of a known power to the antenna of the receiver, such that substantially no interference signals are present other than thermal noise signals, calculate the in-band carrier power using the channel estimate according to the equation $$\text{in-band carrier power} = \sum_{L=0}^{L-1} |h(k)|^2,$$

where $h(k)$ is a channel response, and L is a number of channel taps in the receiver of the communications system, and determine the carrier power scaling factor according to the equation $$K_C = \frac{\text{injected carrier power level at antenna}}{\text{calculated in-band interference power}}.$$

According to the second aspect, the digital baseband module is further configured to calculate a true carrier power at the antenna according to the equation $$\text{true carrier power} = a_n \times EC^n + a_{n-1} \times EC^{n-1} + \ldots + a_1 \times EC + a_0,$$

wherein EC equals an estimated in-band carrier power, calculated according to the equation $$\text{in-band carrier power} = \sum_{L=0}^{L-1} |h(k)|^2,$$

wherein L is a number of channel taps in the receiver of the communications system, and estimate the interference power at the antenna using a method of mapping the determined in-band interference power according to one or more of a method of curve fitting, least square, and linear regression, and further wherein the estimated interference power is dependent upon the detected type of interference signal.

According to the second aspect, the digital baseband module maps the determined in-band interference power, the digital baseband module is further configured to determine that the detected type of interference signal is one of a CCI and sensitivity type interference signal, and calculate a true interference power at the antenna according to the equation $$\text{True Interference Power(CCI)} = b_{CCI}(n) \times E_I^n + b_{CCI}(n-1) \times E_I^{n-1} + \ldots b_{CCI}(1) \times E_I + b_{CCI}(0),$$

wherein EI equals an estimated in-band interference power, calculated according to the equation $$\text{in-band interference power} = \sum_n |\hat{I}(n)|^2.$$

According to the second aspect, the digital baseband module is further configured to determine that the detected type of interference signal is an ACI type interference signal, and calculate a true interference power at the antenna according to the equation $$\text{True Interference Power(ACI)} = b_{ACI}(n) \times E_I^n + b_{ACI}(n-1) \times E_I^{n-1} + \ldots b_{ACI}(1) \times E_I + b_{ACI}(0),$$

wherein EI equals an estimated in-band interference power, calculated according to the equation $$\text{in-band interference power} = \sum_n |\hat{I}(n)|^2.$$

BRIEF DESCRIPTION OF THE DRAWINGS

The above and other objects and features of the present general inventive concept will become apparent and more readily appreciated from the following description of the embodiments with reference to the following figures, wherein like reference numerals refer to like parts throughout the various figures unless otherwise specified, and wherein.

DETAILED DESCRIPTION

Figure 1:
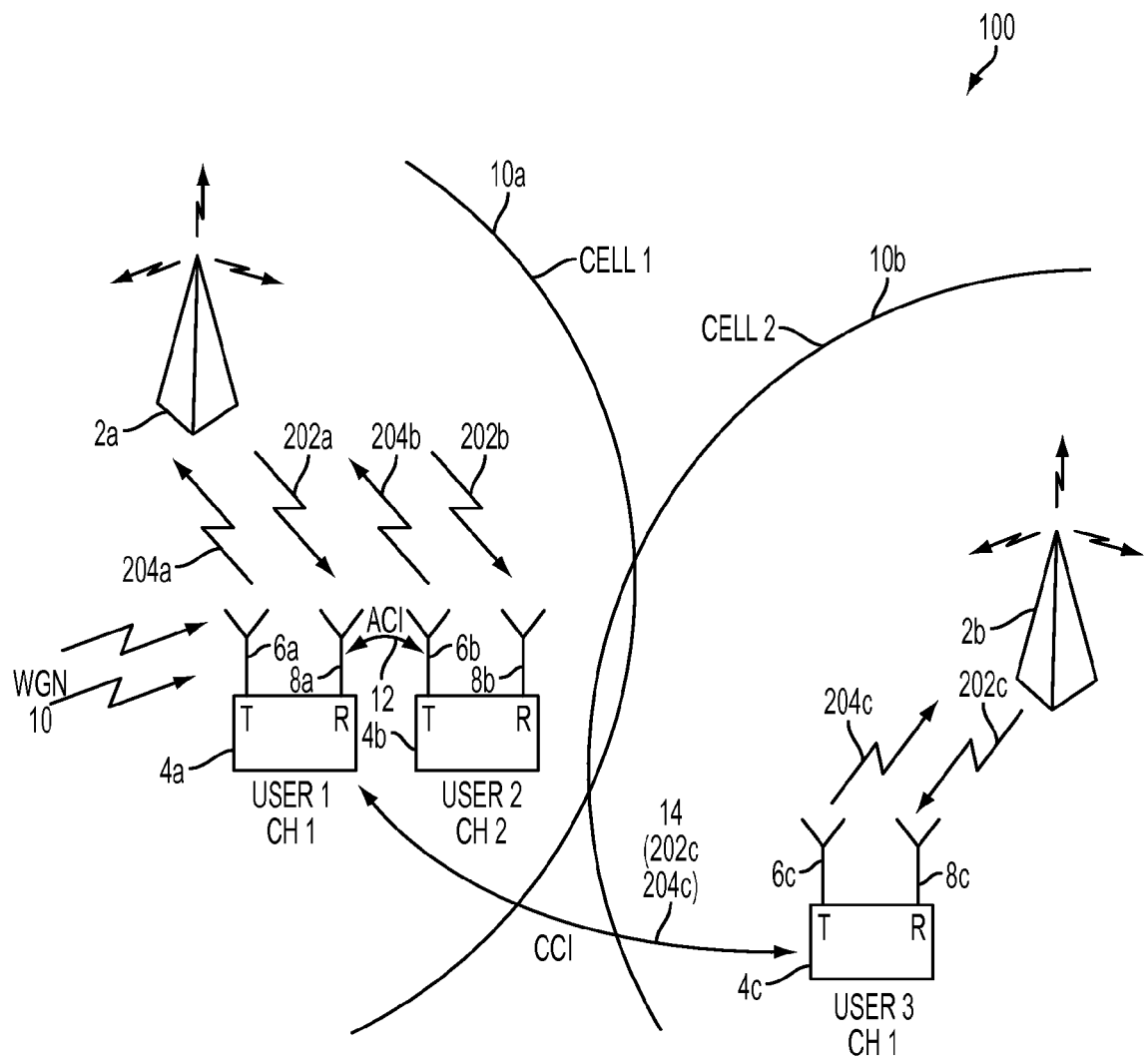
FIG. 1 is a diagram of a multi-user communications system illustrating co-channel interference and adjacent-channel interference between user equipment.

The inventive concept is described more fully hereinafter with reference to the accompanying drawings, in which embodiments of the inventive concept are shown. In the drawings, the size and relative sizes of layers and regions may be exaggerated for clarity. Like numbers refer to like elements throughout. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the invention is therefore defined by the appended claims. The following embodiments are discussed, for simplicity, with regard to the terminology and structure of user equipment in a radio communication system using an antenna, e.g., a cellular communications system and a cell phone. However, the embodiments to be discussed next are not limited to these systems but may be applied to other wired and wireless communication systems that are affected by co-channel interference, and adjacent channel interference.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

Used throughout the specification are several acronyms, the meaning of which are provided as follows: radio frequency (RF); intermediate frequency (IF); local oscillator (LO); analog-to-digital converter (ADC); digital-to-analog converter (ADC); automatic gain control (AGC); signal-to-interference-plus-noise ratio (SINR); received signal strength indicator (RSSI); low noise amplifier (LNA); adaptive multi-rate (AMR); coder-decoder (CODEC); global system of mobile communications (GSM); bit error rate (BER); co-channel interference (CCI); adjacent channel interference (ACI); white Gaussian noise (WGN); start time fair queuing (SFQ); carrier-to-interferer (C/I) power; base station (BS); mobile station (MS); data transmission rates (DTR); soft-bit quality (SFQ); unit-under-test (UUT); absolute radio-frequency channel number (ARFCN); wide-band code division multiple access (WCDMA); long term evolution (LTE); space-time interference cancellation (ST-IRC) algorithm; single antenna interference cancellation using 2× over-sampled data (SAIC2×); single antenna temporal whitening (SATW) equalizer; mega-instructions per second (MIPS) rate; signal-to-interference ratio (SIR); mobile station receive diversity (MSRD) equalizers; active Codec (mode) set (ACS); discontinuous transmission (DTX); and carrier-to-interference ratio (CTOI).

According to an exemplary embodiment, a new technique is presented to estimate the total interference power at the antenna input that does not suffer from the problems mentioned above. The system and method(s) discussed herein can be very useful for improved receiver performance and proper operation of AGC, link adaption, AMR codec setting, among other communications operations.

Figure 3:
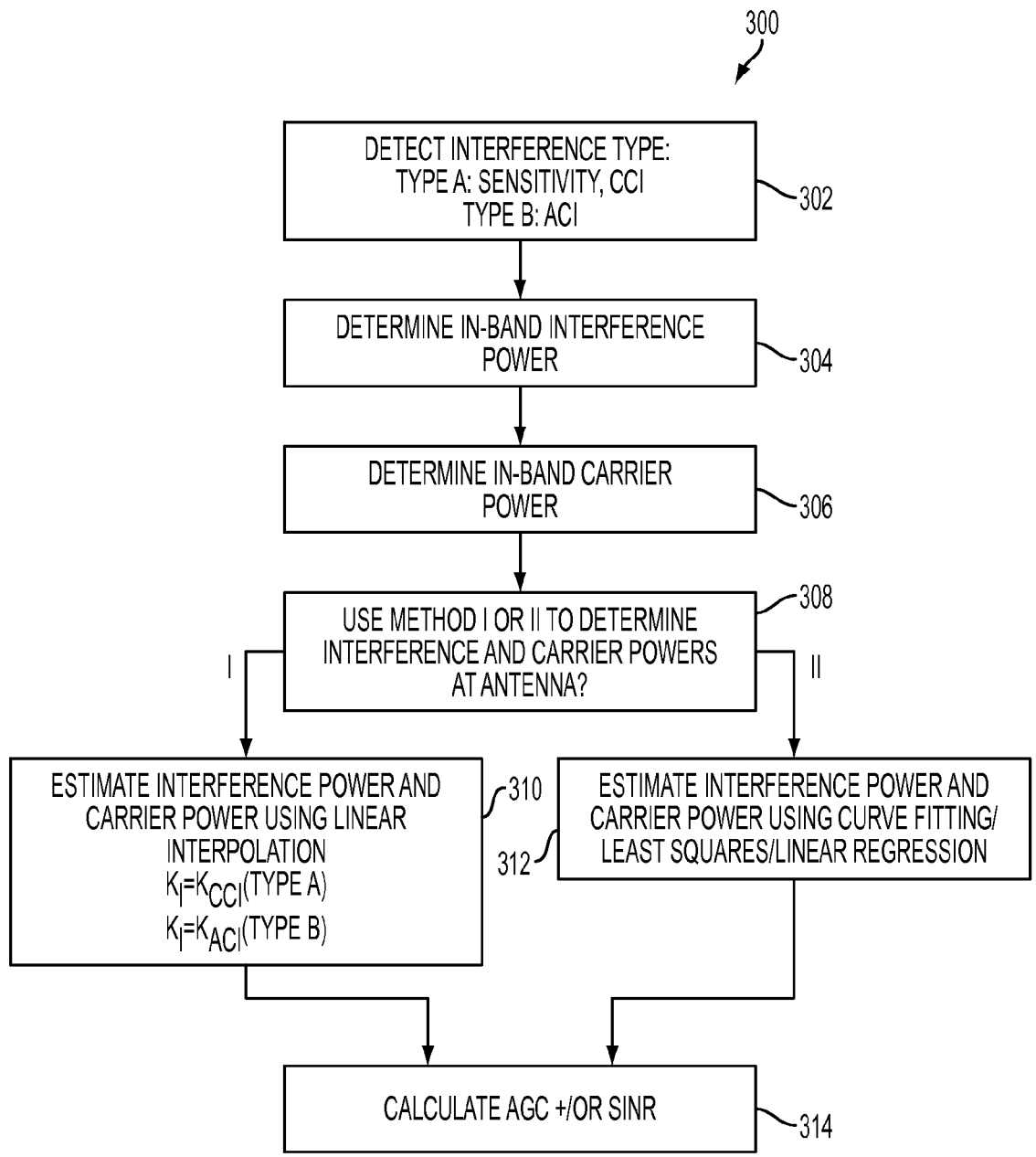
FIG. 3 is a flow chart illustrating a top-level method for estimating interference power and carrier power at an antenna in a communications system such that a ratio of carrier to interference powers can be determined for the use in automatic gain control and signal-to-interference-and-noise ratio determinations according to an exemplary embodiment.

Reference is made to FIG. 3, which is a flow chart illustrating a top-level method 300 for estimating interference power and carrier power at an antenna in a communications system such that a ratio of carrier to interference powers can be determined for the use in automatic gain control and signal-to-interference-and-noise ratio determinations according to an exemplary embodiment.

Method 300 begins with step 302, wherein an interference type is detected. The interference type can be one of at least three different types, although according to alternative exemplary embodiments, other interference types can also be incorporated within the systems and method discussed herein. The three types of detected interference include sensitivity, CCI, and ACI. The three types of interference are categorized into two types: Type A, which includes sensitivity and co-channel interference, and Type B, which includes adjacent channel interference. Following step 302, in step 304 and 306, the in-band interference power and the in-band carrier power are determined.

In step 308, which follows step 306, a determination is made as to which method should be used to determine the interference and carrier powers at the antenna. According to an exemplary embodiment, method I is defined as a linear interpolation based on the in-band interference and in-band carrier powers determined in steps 304 and 306, respectively. The determination of the power of the interference signal at the antenna and the determination of the carrier power at the antenna using linear interpolation occurs in step 310, and is calculated according to the following two equations:

$$P_{interference} = K_I \times \text{inband\_interference\_power} \quad \text{(Eq. 4)},$$

and $$P_{carrier} = K_c \times \text{inband\_carrier\_power} \quad \text{(Eq. 5)},$$

where $K_c$ and $K_I$ are scaling factors. The value of $K_I$ is set differently according to the type of interference scenario, Type A or B. The inband_interference_power (in-band interference power) and inband_carrier_power (in-band carrier power) are also referred to as the estimated interference and carrier powers, respectively, and are determined at the baseband block 214, according to equations shown and discussed in greater detail below (Eq's. 15 and 16).

For interference scenario Type A, sensitivity and CCI interference types, $K_I$ is set equal to $K_{CCI}$. For interference scenario Type B, ACI interference type, $K_I$ is set equal to $K_{ACI}$.

According to an alternate exemplary embodiment, method II can be used to determine the interference and carrier powers at the antenna. Therefore, if in step 308 it is determined that method II should be used to determine the interference and carrier powers at the antenna, then in step 312 curve fitting is used instead of linear interpolation to match the estimated interference and carrier powers to known interference and carrier powers that have been input from test equipment. According to an exemplary embodiment, the type of interference is relevant to the use of curve fitting in the determination of the interference and carrier powers at the antenna. Following either step 310 or 312, step 314 occurs, wherein AGC settings and SINR information is determined and used within the receiver, as discussed above. A detailed discussion of the method for estimating interference and carrier power at the antenna of a MS follows, in view of FIG. 4.

Figure 4A:
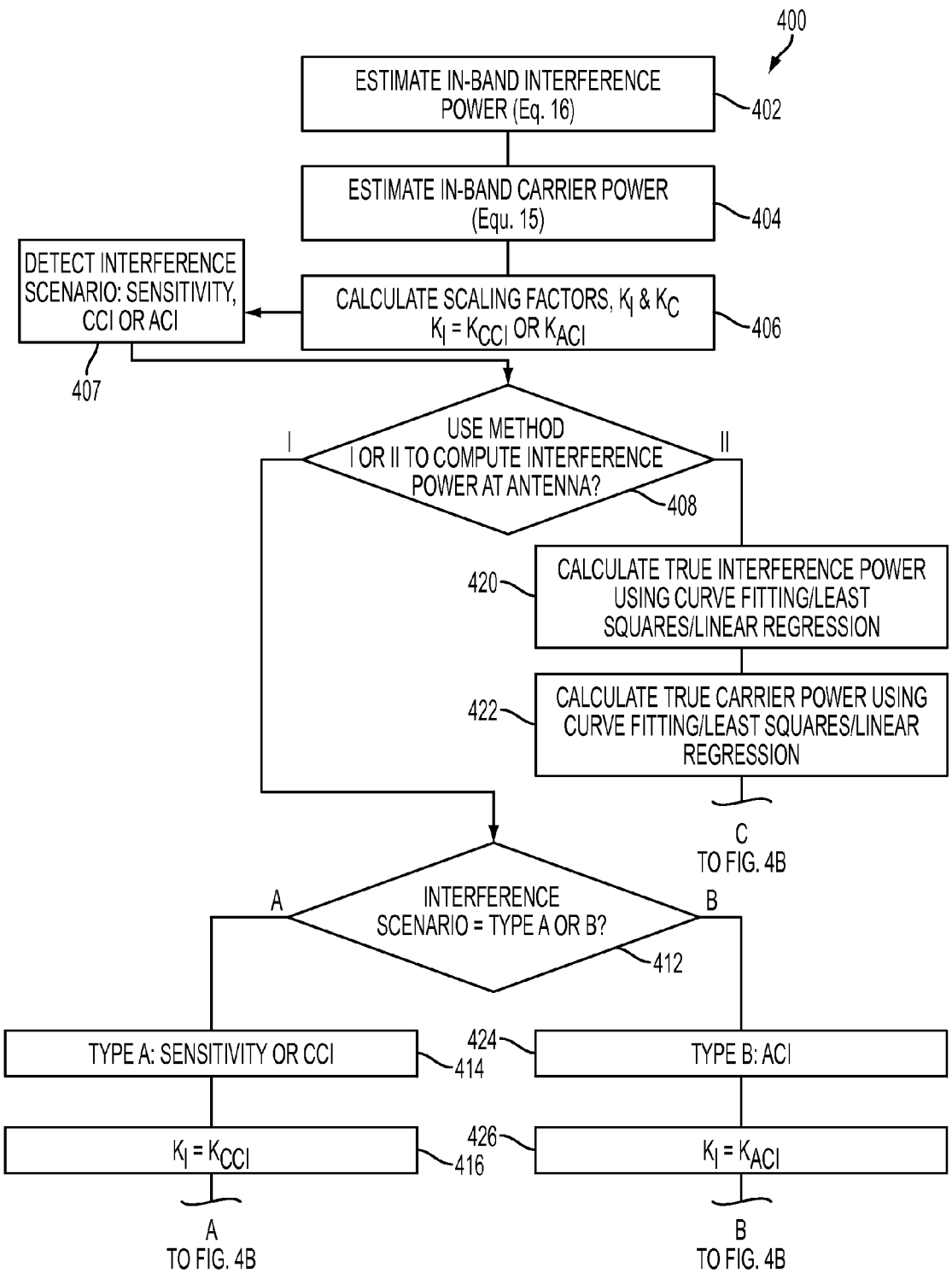
FIG. 4 is a flow chart illustrating a detailed method for estimating interference power and carrier power at an antenna in a communications system such that a ratio of carrier to interference powers can be determined for the use in automatic gain control and signal-to-interference-and-noise ratio determinations according to an exemplary embodiment.
Figure 4B:
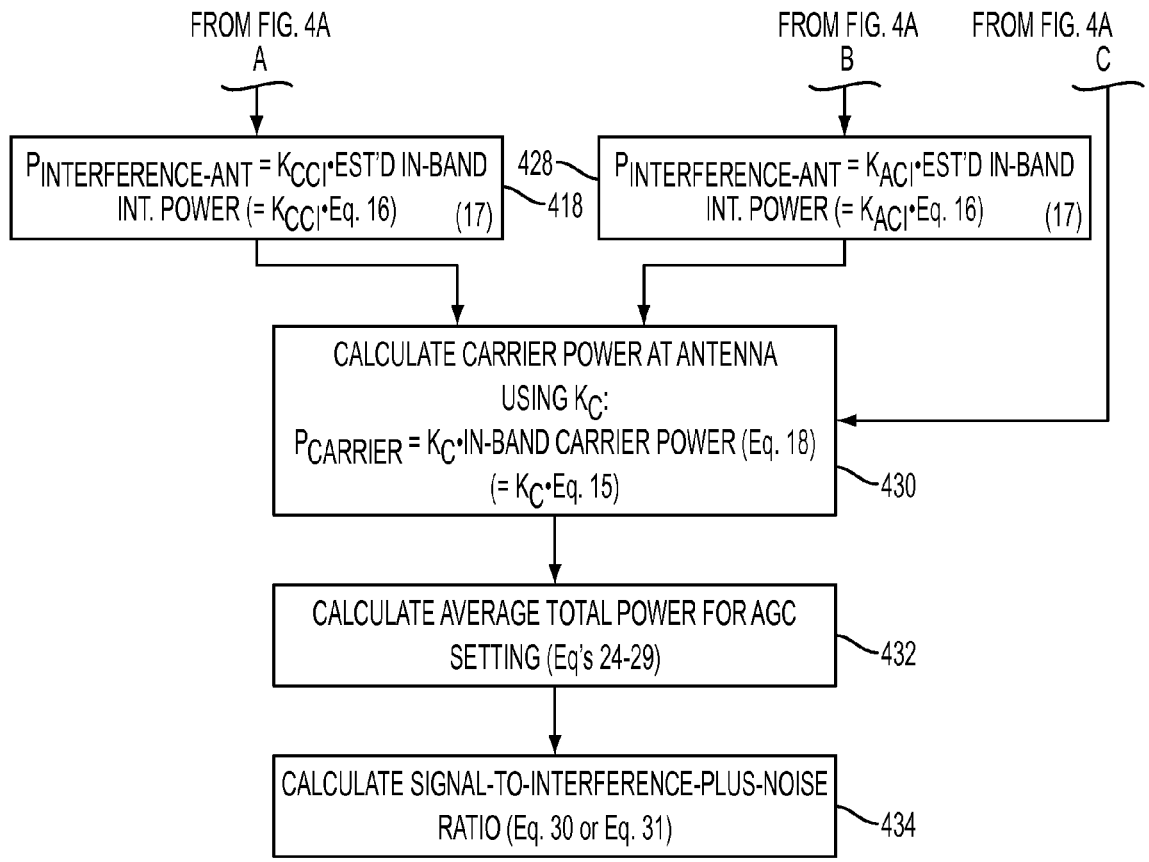

FIG. 4 is a flow chart illustrating a detailed method 400 for estimating interference power and carrier power at an antenna in a communications system such that a ratio of carrier to interference powers can be determined for the use in automatic gain control and signal-to-interference-and-noise ratio determinations according to an exemplary embodiment.

According to an exemplary embodiment, method 400 estimates the out-of band interference power and the out-of band carrier power at the antenna by computing the in-band interference power and the in-band carrier power, detecting the interference type as Type A (sensitivity and CCI interference scenarios) or Type B (ACI interference scenario) and then by interpolating or mapping/curve-fitting the in-band interference and in-band carrier powers to the out-of band interference and carrier powers. From the determined out-of band interference and carrier powers, the total received power can be determined, and both the AGC settings and SINR can then be calculated, as described in greater detail below.

According to an exemplary embodiment, a determination needs to be made of whether the interference scenario is of the sensitivity, CCI or ACI type. The complex-valued, baseband, symbol-spaced model for the received signal r(n) is shown in equation 6:

$$r(n) = \sum_{k=0}^{N} h(k)s(n-k) + I'(n) + w(n), \quad \text{(Eq. 6)}$$

where n is the time index, r is the received symbol, h is the channel response, s is the transmitted symbol, I' is the combined interference signal and w is the additive white Gaussian noise. Equation 6 can be rewritten as—

$$r(n) = \sum_{k=0}^{N} h(k)s(n-k) + I(n), \quad \text{(Eq. 7)}$$

where I is the combined interference and noise term.

The interference I(n) can be modeled as the sum of three signals passed through the received filter:

$$I(n) = I_{CCI}(n) + I_{ACI}(n) + w(n) \quad \text{(Eq. 8)},$$

where $I_{CCI}(n)$ is the low-pass filtered co-channel interference, $I_{ACI}(n)$ is the low-pass filtered adjacent channel interference, and w(n) is the filtered thermal noise.

According to a further exemplary embodiment, the following steps are performed to find out the interference type (white noise, CCI, or ACI) that best suits the received signal. First, a channel estimation, synchronization position ($n_0$) and DC offset compensation will be performed on the received I-Q samples. This channel estimate can be a simple least squares estimate and a 3 tap channel estimation suffices. Following the determination of the channel estimate, the interference samples I(n) are calculated by subtracting the convolution of the reference training sequence (s) and channel estimate (h) from the received samples, starting at the synch position r(n+n0), as shown in equation 9. The estimated complex DC offset is removed prior to the convolution.

$$\hat{I}(n) = r(n) - \sum_{k=0}^{N-1} \hat{h}(k)s(n_0 + n - k). \quad \text{(Eq. 9)}$$

Following the determination of equation 9, the power residues of interference samples, for CCI, ACI, and sensitivity, is computed upon filtering using the pre-calculated whitening filters $f_{CCI}$ and $f_{ACI}$:

$$\hat{I}_{residualCCI}(n) = \hat{I}(n) * f_{CCI}(n) \quad \text{(Eq. 10)},$$

$$\hat{I}_{residualACI}(n) = \hat{I}(n) * f_{ACI}(n) \quad \text{(Eq. 11)},$$

where * denotes the convolution operation.
and then the power residues can be calculated as follows:
Power Residue (PR)—sensitivity:

$$PR \text{ Sensitivity} = \sum_n |\hat{I}(n)|^2. \quad \text{(Eq. 12)}$$

$$\text{Power Residue } (PR) - CCI: PR \text{ } CCI = \sum_n |\hat{I}_{residualCCI}(n)|^2. \quad \text{(Eq. 13)}$$

$$\text{Power Residue } (PR) - ACI: PR \text{ } ACI = \sum_n |\hat{I}_{residualACI}(n)|^2. \quad \text{(Eq. 14)}$$

Once the three power residues have been determined, the interference type that gives the lowest power residue is chosen as the interference type. For example, if the ACI power residue returned the lowest power value, then the interference type would be ACI, and $K_I$ would equal $K_{ACI}$.

The estimated or in-band carrier power, EC, is determined from the channel estimate. Note that the estimated carrier power could have been determined before the power residues, as their values are not included in the calculation of the estimated carrier power ($E_C$) or in-band carrier power, as shown below in equation 15:

$$\text{in\_band\_carrier\_power} = \sum_{k=0}^{L-1} |h(k)|^2. \quad \text{(Eq. 15)}$$

As known by those of ordinary skill in the art, the channel environment may dynamically change from burst to burst, however some sort of averaging is necessary to accommodate the fact that the environment cannot change instantaneously. The current channel type needs to be remembered for long term channel type averaging and detection. Hence, as will be described in more detail below and according to an exemplary embodiment, a forgetting factor is defined according to various embodiments and is used to select the average channel type to decide on the channel environment at any point of time.

According to an exemplary embodiment, the first method for determining the interference power at the antenna is based on first determining the estimated interference power ($E_I$), or what is also known as the in-band interference power, and the type of interference detected, which can be one of sensitivity, CCI, or ACI.

$$\text{In\_band\_interference\_power} = \sum_n |\hat{I}(n)|^2 \quad \text{(Eq. 16)},$$

(note that the in-band interference power is based on the calculated interference samples, as shown in equation 9, discussed above The interference power at the antenna is then determined from the in-band interference power (or estimated interference power, $E_I$), and the type of sensitivity:

$$P_{interference} = K_I \times \text{In\_band\_Interference\_power} \quad \text{(Eq. 17)},$$

where $K_I$ is a scaling factor which maps the in-band (or estimated) interference power to the interference power at the antenna.

According to an exemplary embodiment, in CCI scenarios, the desired signal and interference occupy the same frequency band and nearly the same band-width (the interfering signal has the same modulation type as the input/desired signal) and the scaling factor $K_I$ is set equal to $K_{CCI}$. For sensitivity type interference scenarios, the scaling factor $K_I$ is also set equal to $K_{CCI}$, as the thermal noise and the signal occupy nearly the same bandwidth.

For the ACI type of interference scenario, however, things are different as the interference power is mainly concentrated in the higher frequencies while the signal power is limited to the signal band-width (for GSM case, the 3 dB single sided bandwidth is about 85 KHz). The ACI interference is severely attenuated by the RF low pass filters as compared to the CCI and thermal noise (sensitivity type of interference). According to an exemplary embodiment, therefore, a different scaling factor for the ACI type of interference scenario is used, and $K_I$ is set equal to $K_{ACI}$. In summary, if the type of interference detected is CCI or sensitivity, then $K_I$ is set equal to $K_{CCI}$, and if the type of interference detected is ACI, then $K_I$ is set equal to $K_{ACI}$.

According to an exemplary embodiment, the carrier power at the antenna, $P_{carrier}$ can be determined in a manner similar to that of the interference power:

$$P_{carrier} = K_c \times \text{in\_band\_carrier\_power} \quad \text{(Eq. 18)},$$

wherein $K_c$ is the carrier power scaling factor, and the in-band carrier power is determined according to equation 15, and is also known as the estimated carrier power, $E_C$.

According to a further exemplary embodiment, there is another method for determining the interference power and carrier power at the antenna. The "true interference power" refers to the actual interference power at the antenna while "true carrier power" refers to the actual carrier power at the antenna. The second method for determining the interference and carrier powers at the antenna makes use of the estimated interference power ($E_I$) determined according to Eq. 16, and the estimated carrier power ($E_C$), determined according to Eq. 15. Furthermore, in determining the true interference power, the second method according to an exemplary embodiment makes use of the detected type of interference similar to the first method discussed above. Method two for determining the true interference power and the true carrier power utilizes the mathematical tools of curve fitting, least squares, or linear regression to match the estimated carrier power and the estimated interference power to the true carrier and the true interference powers, respectively.

$$\text{True Carrier Power} = a_n \times E_C^n + a_{n-1} \times E_C^{n-1} + \ldots a_1 \times E_C + a_0, \quad \text{(Eq. 19)}$$

wherein $a_n$ are the coefficients which match the estimated carrier power to the True carrier power. A simple method to determine the coefficients $a_n$ is to use the Least Squares approach as follows:

$$TCP_0 = a_n \times E_{C0n} + a_{n-1} \times E_{C0n-1} + \ldots a_1 \times E_{C0} + a_0$$

$$TCP_1 = a_n \times E_{C1n} + a_{n-1} \times E_{C1n-1} + \ldots a_1 \times E_{C1} + a_0$$

$$TCP_m = a_n \times EC_{mn} + a_{n-1} \times EC_{mn-1} + \ldots a_1 \times E_{Cm} + a_0$$

Let $$\underline{T} \stackrel{def}{=} \begin{bmatrix} TCP0 \\ TCP1 \\ \vdots \\ \vdots \\ TCPm \end{bmatrix}$$

$$\underline{E}_c \stackrel{def}{=} \begin{bmatrix} E_{C0}^n & E_{C0}^{n-1} & \vdots & 1 \\ E_{C1}^n & E_{C1}^{n-1} & \vdots & 1 \\ \vdots & \vdots & & \\ \vdots & \vdots & & \\ E_{Cm}^n & E_{Cm}^{n-1} & \ldots & 1 \end{bmatrix}$$

$$\underline{a} \stackrel{def}{=} \begin{bmatrix} a_n \\ a_{n-1} \\ \vdots \\ \vdots \\ a_0 \end{bmatrix}$$

then $$\underline{a} \stackrel{def}{=} (\underline{E}_c^H \underline{E}_c)^{-1} \underline{E}_c^H \underline{T}$$

If the detected interference type is of the CCI or sensitivity type, then the true interference power will be determined according to equation 20a, shown below:

True Interference Power(CCI) = $b_{CCI}(n) \times E_I^n + b_{CCI}(n-1) \times E_I^{n-1} + \ldots b_{CCI}(1) \times E_I + b_{CCI}(0)$ (Eq. 20a).

However, if the detected interference is of the ACI type, then the true interference power will be determined according to equation 20b, shown below:

True Interference Power(ACI)

= $b_{ACI}(n) \times E_I^n + b_{ACI}(n-1) \times E_I^{n-1} + \ldots b_{ACI}(1) \times E_I + b_{ACI}(0)$ (Eq. 20b), wherein, according to a further exemplary embodiment, the factor $b_n$ is determined in a manner substantially similar to that of $a_n$.

According to an exemplary embodiment, the scaling factors $K_{CCI}$, $K_{ACI}$, and $K_C$ are determined through empirical approaches. In an actual physical platform, i.e., a test set-up of a mobile station device 200, using actual RF test equipment, the test equipment is programmed to provide signals that replicate sensitivity, CCI, and ACI scenarios. Each such test scenario shall now be described in turn.

Determination of the $K_{CCI}$ scaling factor. In order to empirically determine the $K_{CCI}$ scaling factor, the proscribed test equipment (a detailed discussion of which has been omitted for the dual purposes of clarity and brevity) is prepared to generate co-channel interference signals. Once the test equipment is set up, and the CCI signals are provided to the unit-under-test (UUT), the in-band interference power (or estimated interference power; Eq. 16) is determined from the interference samples. Because the injected CCI interference power at the antenna that has been set in the test equipment is known, the $K_{CCI}$ scaling factor is relatively easily computed from the following equation:

$$K_{CCI} = \frac{\text{Injected CCI Interference Power at Antenna}}{\text{Estimated Inband Interference Power}} \quad \text{(Eq. 21)}$$

Determination of the $K_{ACI}$ scaling factor is similar. In order to empirically determine the $K_{ACI}$ scaling factor, the proscribed test equipment is prepared to generate adjacent channel interference signals. Once the test equipment is set up, and the ACI signals are provided to the UUT, the in-band interference power (or estimated interference power; Eq. 16) is determined from the interference samples. Because the injected ACI interference power at the antenna that has been set in the test equipment is known, the $K_{ACI}$ scaling factor is relatively easily computed from the following equation:

$$K_{ACI} = \frac{\text{Injected ACI Interference Power at Antenna}}{\text{Estimated Inband Interference Power}} \quad \text{(Eq. 22)}$$

According to a further exemplary embodiment, determination of the carrier power scaling factor, or $K_C$, is also determined fairly similarly to that of $K_{CCI}$ and $K_{ACI}$. In order to empirically determine the carrier power scaling factor $K_C$, the proscribed test equipment is prepared to generate a sensitivity-type interference signal. In essence, however, a sensitivity-type interference signal is one wherein no interference signal is present—only thermal noise, and thus the injected signal shall be hereon in referred to as an injected carrier power signal. According to an exemplary embodiment, only carrier power needs to be supplied to the antenna, but no purposeful interference signal is injected, and therefore only thermal noise (i.e., that which is inherently present in an antenna) in addition to the carrier power signal is present at the antenna of the UUT. Once the test equipment is set up, and the carrier power signal is provided to the UUT, the in-band carrier power (or estimated carrier power; Eq. 15) is determined from the interference samples. Because the injected carrier power at the antenna that has been set in the test equipment is known, the carrier power scaling factor $K_C$ is relatively easily computed from the following equation:

$$K_C = \frac{\text{Injected Carrier Power at Antenna}}{\text{Estimated Inband Carrier Power}}. \quad \text{(Eq. 23)}$$

As discussed above, and according to a further exemplary embodiment, the above discussed determinations of the interference and carrier powers at the antenna can be used to compute AGC settings. In an exemplary embodiment, the instantaneous carrier power and instantaneous interference power are computed and averaged to determine an average total power at the antenna. The averaging is performed in order to avoid frequent AGC changes due to transient disturbances. The instantaneous power for the current frame/burst is determined for both interference and carrier signals:

$$P_{carrier\_instanteneous} = K_C \times \text{in\_band\_carrier\_power} \quad \text{(Eq. 24)}.$$

Note, however, that although equation 24 is similar to equation 18, it is computed over a burst/frame period.

$$P_{interference\_instanteneous} = K_I \times \text{in\_band\_interference\_power} \quad \text{(Eq. 25)}.$$

Equation 25 is similar to equation 17, but again is computed over a burst/frame period.

The instantaneous carrier power and the instantaneous interference are then averaged across bursts by using a forgetting factor $\alpha$:

$$P_{Carrier\_average} = \alpha \times P_{Carrier\_average} + (1-\alpha) \times P_{Carrier\_instantaneous} \quad \text{(Eq. 26)},$$

and $$P_{interference\_average} = \alpha \times P_{interference\_average} + (1-\alpha) \times P_{Interference\_instantaneous} \quad \text{(Eq. 27)}.$$

For example for GSM/GPRS, the forgetting factor is determined such that the settling time is 200 millisecond. The forgetting factor $\alpha$ can be chosen in a different way depending on the intended application.

According to a further exemplar embodiment, the averaged total power required for AGC gain computation is simply the sum of the averaged carrier power and the averaged interference power:

$$P_{Total\_average} = P_{Carrier\_average} + P_{interference\_average} \quad \text{(Eq. 28)};$$

or, re-written in terms of dB:

$$P_{Total_{average}}(\text{dB}) = 10 \times \log 10 (P_{Carrier_{average}} + P_{Interference\_average}) \quad \text{(Eq. 29)}.$$

As discussed above, and according to a further exemplary embodiment, the above discussed determinations of the interference and carrier powers at the antenna can be used to compute the SINR. In an exemplary embodiment, the SINR can be computed from the averaged carrier power and the averaged interference power according to the following equation:

$$SINR = \frac{P_{Carrier\_average}}{P_{Interference\_average}}$$

(Eq. 30), or, re-written in terms of dB:

$$SINR(\text{dB}) = P_{Carrier_{average}}(\text{dB}) - P_{Interference_{average}}(\text{dB}) \quad \text{(Eq. 31)}.$$

As those of skill in the art can appreciate, SINR is estimated at the mobile receiver to provide statistics on the received signal's quality.

As those of skill in the art can appreciate, being able to more accurately determine the interference and carrier powers at the antenna can have significant benefits in being able to operate a mobile station in a multi-user communications system environment. The method discussed herein estimates the interference power very accurately taking the out-of-band interference power into account. This helps in improving the receiver performance in several different ways.

First, the method disclosed herein according to the exemplary embodiments helps to estimate the total interference power at the antenna very accurately. Consequently, the SINR estimated at the antenna by using this technique is very accurate. Second, the method disclosed herein according to the exemplary embodiments can also be used in determining AGC settings. When the total power, shown immediately above, is used in the AGC algorithm then the gain control is very accurate in the operating region. For AGC, knowledge of the total power at the LNA is required for accurate gain control, and the total power provided by the exemplary embodiments is provided accurately by the method discussed herein. Furthermore, since the ACI interference is attenuated by the RF filters, using RSSI for AGC control is not recommended.

Third, the method disclosed herein according to the exemplary embodiments has been tested to determine both AGC settings and SINR computations on actual devices (platform) and in computer simulations, and has provided accurate results in both cases. By using the exemplary methods discussed herein, the two important parameters can be accurately estimated, and as a result have resulted in improving receiver performance.

Fourth, the method disclosed herein according to the exemplary embodiments can be used to improve adaptive multirate (AMR) codec rate switching for GSM systems. As those of ordinary skill in the art can appreciate, for AMR codec rate switching, the SINR at the antenna is required. The following test that has been proscribed by the Mobile Station Conformance Specification, 3GPP TS 51 010-1m (the "TS 51 Specification"), illustrates the importance of improved SINR performance, which can be improved by more accurate knowledge of the carrier and interference powers at the antenna, as the method disclosed herein according to the exemplary embodiments.

The test defined by the TS 51 Specification provides that when a traffic channel supporting an AMR speech codec is activated, the Codec Mode Request is sent by MS 200 in band every other speech frame to indicate to the multi-use wireless system (network) 100 the recommended codec mode of the active Codec (mode) set (ACS) to use on the downlink. Then, for TULow channel conditions with ideal frequency hopping without DTX activated, MS 200 shall produce Codec Mode Requests with the following accuracy: Requirement 1—When a carrier to interferer ratio (i.e., SINR) 4 dB higher than a defined upper threshold is applied to the antenna connector, MS 200 shall request a higher mode with a probability exceeding 90%. This shall be measured immediately after a settling-time of 200 ms. Requirement 2—When a carrier to interferer ratio 4 dB lower than a defined lower threshold is applied to the antenna connector, MS 200 shall request a lower mode with a probability exceeding 90%. This shall be measured immediately after a settling-time of 200 ms.

From the above it is clear that for the test defined by the TS 51 Specification to pass, the SINR at the antenna input should be estimated accurately, as is done by the exemplary embodiments discussed herein. The AMR codec mode change request should be sent whenever the SINR at the antenna input changes by more than 4 dB. Hence the estimated SINR at the antenna needs to be accurate to pass the test defined by the TS 51 Specification.

Still further according to exemplary embodiments discussed herein, another advantage provided by the system and method disclosed herein is related to information provided to higher layers by MS 200. As discussed above, the interference power in the baseband is not the same as the interference power at the antenna input due to the RF filtering of out-of-band interferences (e.g. mostly ACI+other out-of-band signals present in the operating environment). It is known that the presence of this ACI and out of band interference signals causes degradation of the communication link. The method disclosed herein according to the exemplary embodiments can assist in detecting the presence of out-of-band interference and the ACI level at the antenna input in an actual environment where MS 200 is interfacing with the real environment.

Using this data, MS 200 can provide feedback to network 100 about the out-of-band signal level and ACI level around the presently allocated frequency channel. Knowing this information, the network 100 can take a decision about whether to use one specific channel or another that may be free for the communication link to make the link more robust/reliable.

There is another advantage for use of the system and method according to exemplary embodiments relating to channels in network 100. As is known by those of ordinary skill in the art, in GSM cellular networks, an absolute radio-frequency channel number (ARFCN) is a code that specifies a pair of physical radio carriers and channels used for transmission and reception on the physical air interface, one for the uplink signal and one for the downlink signal. Still further, in scenarios where the adjacent channel is of interest by being a part of a neighbor cell list, the knowledge of a strong adjacent channel can be made use of for gathering more statistics to eventually handover to this channel.

According to further exemplary embodiments, the system and method discussed herein involves very low computational complexity, and the system and methods can be used in GSM, WCDMA and LTE or any other multiuser wireless systems to estimate the interference.

Although detection of interference types are known to those of ordinary skill in the art, improvements to MS 200 performance can be achieved by determination of the interference type. For example, according to an exemplary embodiment, various radio parameters can be set based on the detected interference type. Some of the applications of interference detection include RF digital filter selection. In selection of the RF digital filter, the receiver ACI performance is dependent on the RF filters and the baseband algorithms. While some current receivers, such as those used by ST-Ericsson, already use a state of the art space-time interference rejection combining (ST-IRC) algorithm for interference suppression, and therefore the margin for further performance improvement is fairly small, by dynamically selecting the RF digital filter based on the detected interference type, the receiver performance in MS 200 can be improved. If the detected interference type is sensitivity or CCI, then a wider digital RF filter can be loaded since wider bandwidth improves the sensitivity and co-channel performance for an SAIC2× receiver. If, however, an ACI interference type is detected, then a narrower RF filter would filter or suppress the ACI and hence improve the SINR at the equalizer input thus improving the receiver performance. Thus receiver performance can be improved by loading a suitable wider or narrower bandwidth RF filter depending on the interference type detected in the baseband.

As those of ordinary skill in the art can appreciate, according to a preferred exemplary embodiment, in GSM the bandwidth of the receiver is about 200 kHz. However, using a receive filter bandwidth of about 270 kHz or more is known to improve the sensitivity/co-channel performance. In case of adjacent channel interference, an increased receiver bandwidth is generally less satisfactory to use, as it brings in more interference signal along with it. So usage of a receiver filter of bandwidth of about 200 kHz can be used for the adjacent channel case; as those of ordinary skill in the art can appreciate, a receiver filter bandwidth of about 200 kHz is referred to in literature as "narrow band." According to an exemplary embodiment, the narrowband receiver filter will have a filter bandwidth less than an application specific bandwidth. Similarly usage of receiver bandwidth greater than 200 kHz (to aid sensitivity/co channel scenarios) is called "wideband." According to a further exemplary embodiment, the wideband receiver filter will have a filter bandwidth greater than an application specific bandwidth. Still further, for the single antenna case alone different equalizers of varying complexity can be used. For example, according to an exemplary embodiment a low complexity equalizer suppresses less interference by means of employing algorithms of lower complexity. Conversely, according to a further exemplary embodiment, a high complexity equalizer uses improved algorithms and thereby provides better performance. But, as those of ordinary skill in the art can appreciate, high complexity can also mean using improved hardware and hence more than one antenna as well.

According to a further exemplary embodiment, further improvements to MS 200 performance can be achieved by determination of the interference type. For example, according to an exemplary embodiment, selection of an equalizer can be optimized based on the detected interference type. According to an exemplary embodiment, equalizers with different computational complexity can be used based on the detected interference type. If the interference type is known to be of the sensitivity type (i.e., no interference, only thermal noise) then a low complexity single antenna temporal whitening (SATW) equalizer can be used that has a lower mega-instructions per second (MIPS) rate and requires less code/data memory. If, however, the type of interference detected is of the CCI/ACI types, and the signal-to-interference ratio (SIR) is low (i.e. there is high interference) then use is made of the SAIC or mobile station receive diversity (MSRD) equalizers that give very good performance under those types of interference scenarios compared to the SATW equalizer, albeit at a cost of higher MIPS and code/data memory. Thus, according to exemplary embodiments, a tradeoff between performance and computational complexity can be performed based on the detected interference type.

According to an exemplary embodiment, method 400, exemplified in FIG. 4 in the form of a flow chart, illustrates a detailed method 400 for estimating interference power and carrier power at an antenna in a communications system such that a ratio of carrier-to-interference powers can be determined for the use in automatic gain control and signal-to-interference-and-noise ratio determinations according to an exemplary embodiment.

Method 400 begins with step 402, wherein an estimation is made of in-band interference power according to equation 16 discussed above. Those of ordinary skill in the art can appreciate that in many cases, the steps of method 400 discussed below, is not indicative of a specific order, in that many steps can be performed in an order different than that shown and described. However, for ease of discussion, a particular order is shown to make understanding o of the exemplary embodiments more readily appreciated.

Following step 402, method 400 proceeds to estimate in-band carrier power according to equation 15 discussed above. Then, in step 406, the scaling factors $K_C$, $K_{CCI}$, $K_{ACI}$ are calculated. Following step 406, in step 407, method 400 proceeds to determine the power residue values associated with the three different interference scenarios (sensitivity, ACI, or CCI), as has been discussed in greater detail above. In decision step 408, a determination is made as to which method will be used compute the interference power at the antenna: according to a first exemplary embodiment, Method I will determine the interference power using the interference scenarios to determine which scaling factor to use and can generally described as a mapping process (Method I path from decision step 408). According to an alternate exemplary embodiment, Method II will calculate the true interference power and the true carrier power using any one of curve fitting, least square or linear regression methods (Method II path from decision step 408), but also uses the detected interference scenarios.

Following step 410, in decision step 412, a determination is made as to which of the interference types is to be selected (the smallest power residue value determines the type of interference scenario, as discussed in greater detail above), Type A (sensitivity or CCI—step 412/414), or Type B (ACI—step 412/424). If the sensitivity type are of the Type A definition, then $K_I$ is set equal to the $K_{CCI}$ scaling factor in step 416. Following step 416, in step 418, method 400 then determines the interference power at the antenna according to equation 17. If, however, the interference type is Type B, then method 400 proceeds to step 426 from step 412/414 and $K_I$ is set equal to $K_{ACI}$. Following step 426, method 400 determines the interference power also according to equation 17, but this time $K_I$ is equal to $K_{ACI}$.

Following either of steps 418 or 428, method 400 proceeds to step 430, wherein the carrier power at the antenna is determined using scaling factor KC and equation 18. Then, according to further exemplary embodiments, the average total power at the antenna can be calculated in step 4323 according to equations 24-29, and the SINR can be calculated in step 434 according to equations 30 or 31.

As discussed above, simulations were performed using the systems and methods according to exemplary embodiments discussed herein. These simulations are discussed in reference to FIGS. 5-8.

Figure 5:
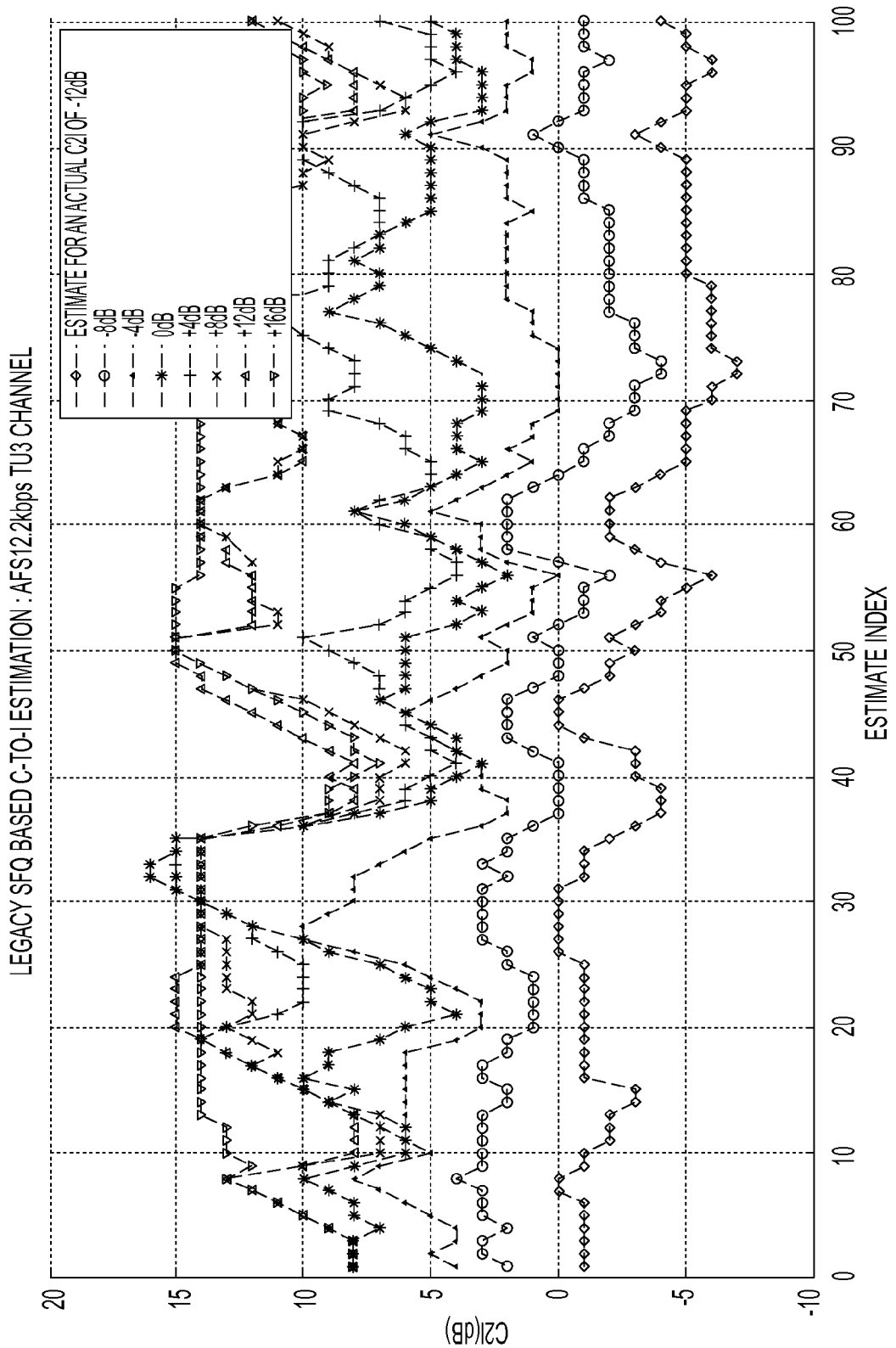
FIG. 5 is a graph of burst-wise statistics of legacy carrier-to-interference estimation for an adaptive multi-rate full speech 12.2 kbps traffic channel, simulated for co-channel interference case of a typical urban channel at 3 kmph (TU3), showing estimated carrier-to-interference-versus-burst number at three different actual carrier-to-interference values.
Figure 6:
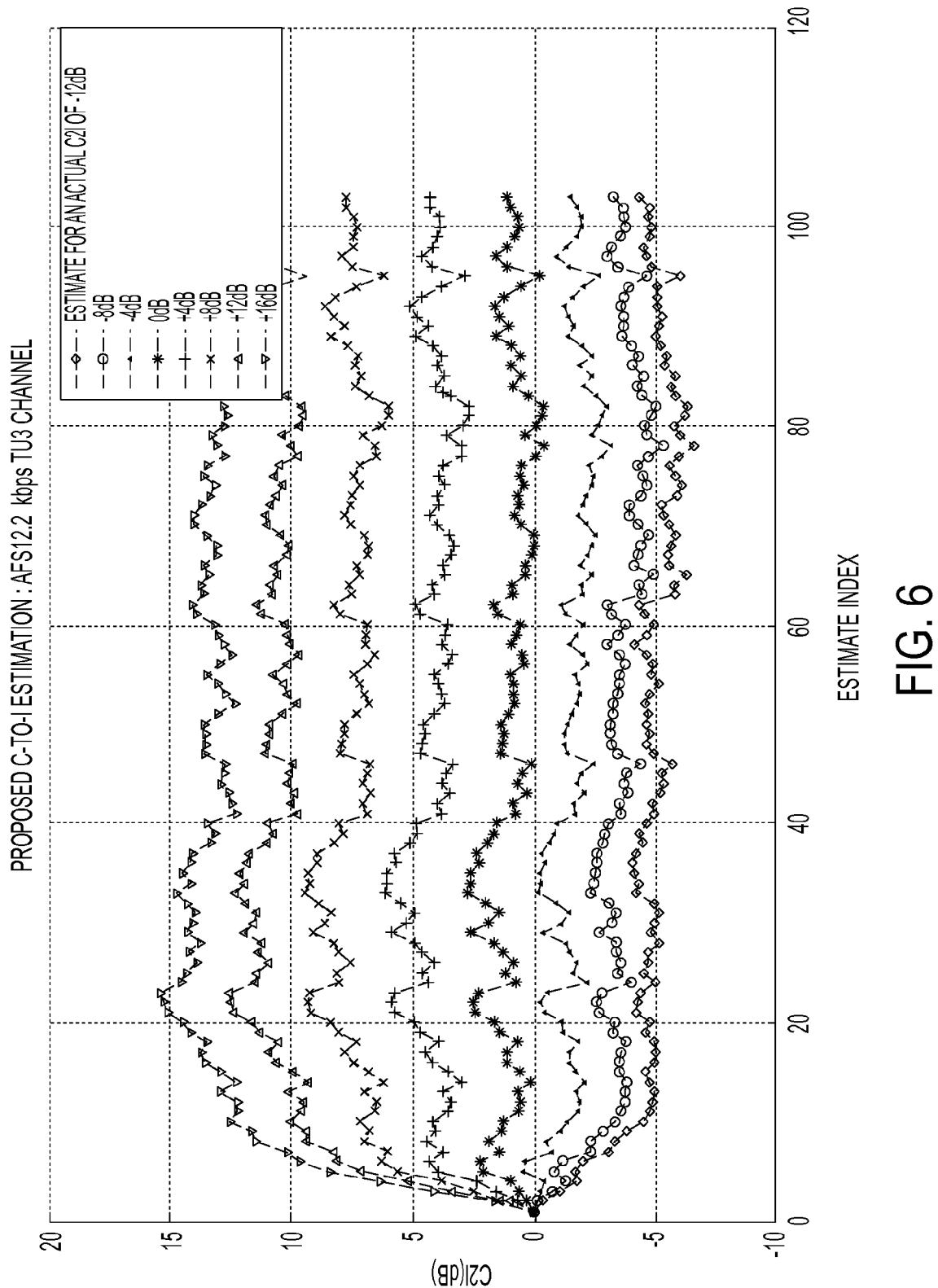
FIG. 6 is a graph illustrating burst wise statistics of multiple signal-to-interference-plus-noise ratio estimations for an adaptive multi-rate full speech 12.2 kbps traffic channel, simulated for co-channel interference case of a typical urban channel at 3 kmph (TU3) according to an exemplary embodiment.

FIG. 5 is a graph of burst-wise statistics of legacy carrier-to-interference estimation for an adaptive multi-rate full speech 12.2 kbps traffic channel, simulated for co-channel interference case of a typical urban channel at 3 kmph (TU3), showing estimated carrier-to-interference-versus-burst number at three different actual carrier-to-interference estimates. FIG. 6, however, is a graph illustrating burst wise statistics of multiple signal-to-interference-plus-noise ratio estimations for an adaptive multi-rate full speech 12.2 kbps traffic channel, simulated for 4.75 co-channel interference case of a typical urban channel at 3 kmph (TU3) according to an exemplary embodiment. FIG. 5 shows the legacy algorithm derived carrier-to-interference ratio estimates, FIG. 6 shows the estimates using the system and method of the exemplary embodiments discussed herein. Comparing FIGS. 5 and 6, it can be seen that FIG. 6 is a closer approximation of the estimated carrier-to-interference ratio compared to the actual value. Further, the methods discussed herein whose results are shown in FIG. 6 also exhibit lesser variance as compared to that of the legacy SFQ based method of FIG. 5.

Figure 7:
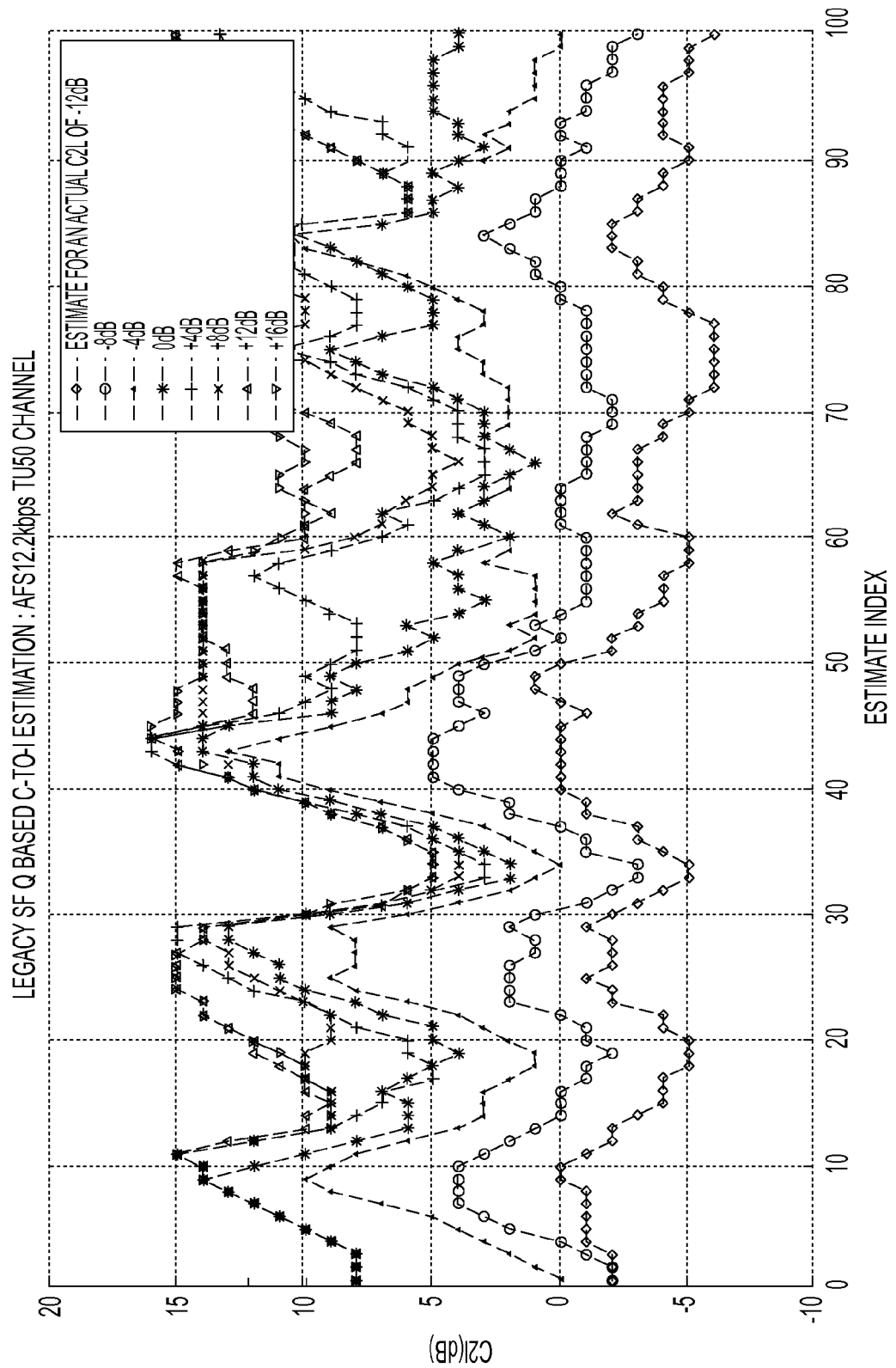
FIG. 7 is a graph illustrating burst wise statistics of multiple signal-to-interference-plus-noise ratio estimations for an adaptive multi-rate half speech 12.2 kbps traffic channel, simulated for 7.45 co-channel interference case of a typical urban channel at 50 kmph (TU50) using a legacy SFQ (soft frame quality) based carrier-to-interference ratio estimation.
Figure 8:
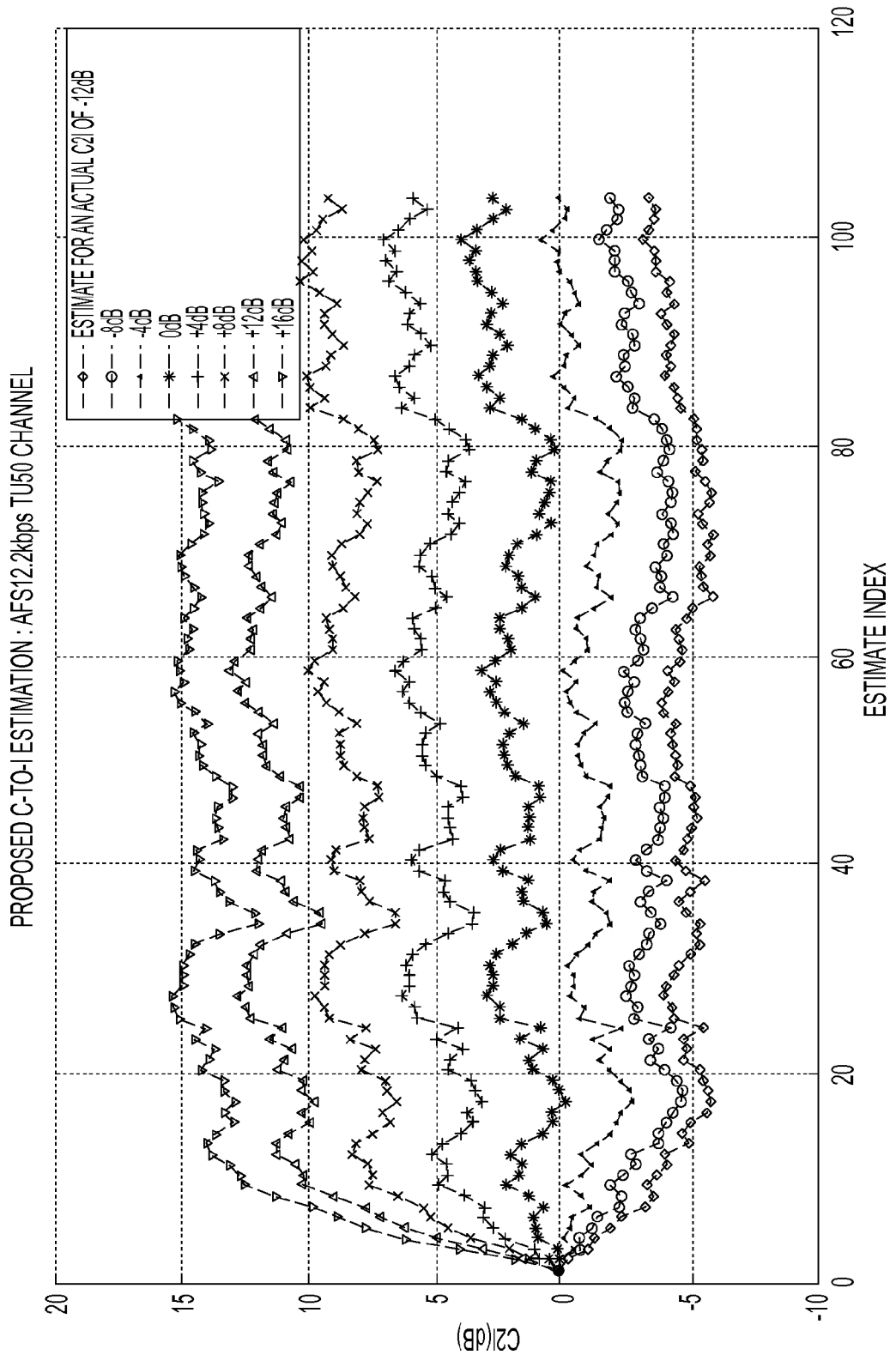
FIG. 8 is a graph illustrating burst wise statistics of multiple signal-to-interference-plus-noise ratio estimations for an adaptive multi-rate half speech 12.2 kbps traffic channel, simulated for co-channel interference case of a typical urban channel at 50 kmph (TU50) 7.55 dynamic adaptive routing protocol (DARP) case according to an exemplary embodiment.

FIG. 7 is a graph illustrating burst wise statistics of multiple signal-to-interference-plus-noise ratio estimations for an adaptive multi-rate half speech 12.2 kbps traffic channel, simulated for co-channel interference case of a typical urban channel at 50 kmph (TU50) according to the legacy SFQ (soft frame quality) based carrier-to-interference ratio estimation. FIG. 8, however, is a graph illustrating burst wise statistics of multiple signal-to-interference-plus-noise ratio estimations for an adaptive multi-rate half speech 12.2 kbps traffic channel, simulated for co-channel interference case of a typical urban channel at 50 kmph (TU50) according to an exemplary embodiment. FIG. 7 shows the legacy algorithm derived carrier-to-interference ratio estimates, and FIG. 8 shows the estimates using the system and method according to an exemplary embodiment. Comparing FIGS. 7 and 8, it can be seen that FIG. 8 is a closer approximation of the estimated carrier-to-interference ratio compared to the actual value. Still further according to exemplary embodiments, the method whose results are shown in FIG. 8 also exhibit smaller amounts of variance as compared to that of the legacy SFQ based method shown in FIG. 7.

Figure 9:
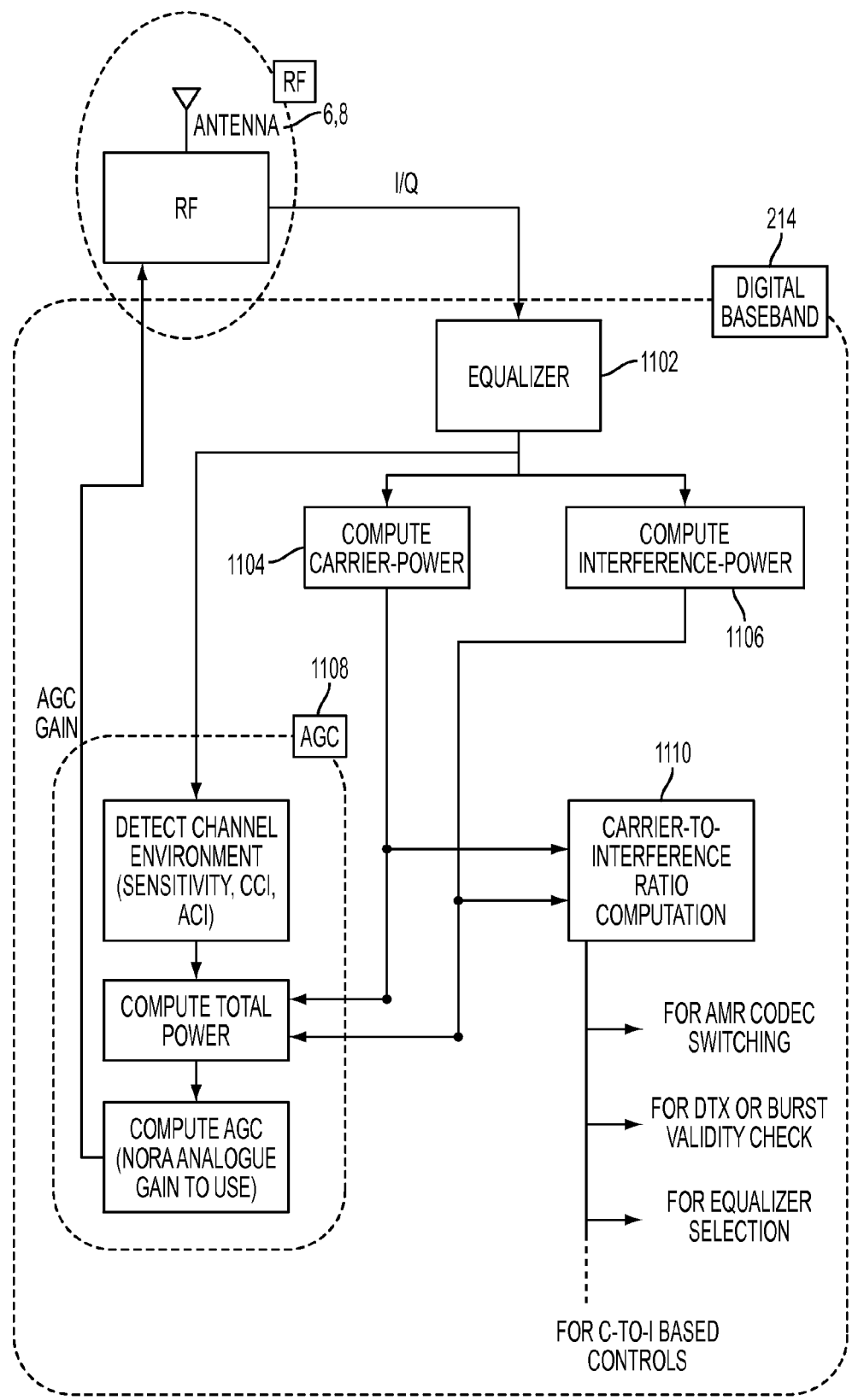
FIG. 9 is a high-level flow diagram illustrating an order and location (within a cellular communications system (by way of example only) of processing of the method according to an exemplary embodiment.

FIG. 9 is a high-level flow diagram illustrating an order and location (within a cellular communications system (by way of example only) of processing of method 300, 400 according to an exemplary embodiment. FIG. 9 is a hybrid diagram showing some physical components of MS 200, and processing of data within, for example, a processor, field programmable gate array, or any other type of computing device or combination of devices, all combinations of which are to be considered within the scope of the exemplary embodiments. In FIG. 9, the signal(s) are received at antenna 6, 8, and an I/Q signal is passed to digital baseband 214. Of course, this presumes that down-conversion and IF conversion of the received RF signal has already taken place; thus, the output signal is a digital signal, and this corresponds to FIG. 2 and the implementation of analog-to-digital converters in baseband block 214. The functional blocks shown in FIG. 9, i.e., equalizer 1102, compute carrier power block 1104, compute interference power block 1106, AGC block 1108, and compute carrier to interference ratio block 1110, can all be realized by the above-described processor or processors through any one of many different means, including the afore-mentioned gate arrays, digital signal processing devices, single or multiple microprocessors, and even complicated arrays of simple logic devices, among other implementations of processing capabilities.

FIG. 9 illustrates one exemplary flow of digital data (data) according to an exemplary embodiment; equalizer block 1102 receives the data, low pass filters it, and then passes it off to block 1104 wherein the carrier power is determined, and to block 1106 wherein the interference power is determined. Following the determination of the carrier and interference powers, the carrier to interference ratio can be determined in block 1110, and the results from that can be sued for AMR codec switching, DTX or burst validity checks, and for use by the equalizer settings, as has been discussed in greater detail above. AGC block 1108 also receives the output of equalizer block 1102 and the carrier and interference power values, and determines the channel environment (sensitivity, CCI, or ACI), computes the total power, and uses those values to compute the AGC settings. The AGC setting is fed back to the RF circuit, which contains filters, amplifiers, and diplexers, among other devices, operating at the RF transmission/reception frequency band.

Figure 2:
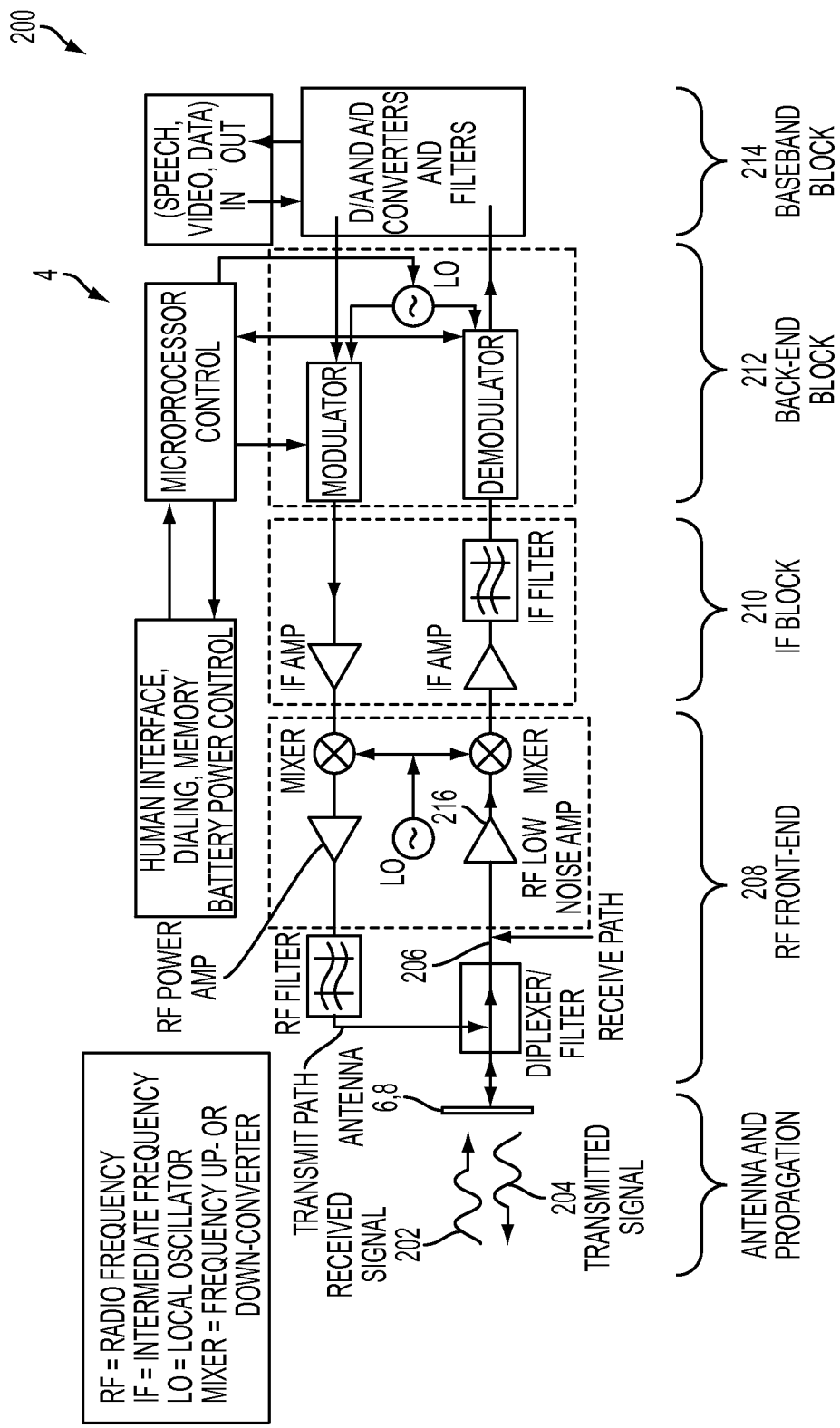
FIG. 2 is a block diagram of user equipment wherein a system and method for estimating interference power and carrier power at an antenna can be used according to an exemplary embodiment.

According to an exemplary embodiment, implementation of methods 300, 400 can occur in a dedicated processor (not shown in either of FIGS. 2 and 9), or through the various functional blocks shown in FIG. 2 such as RF front end 208, IF block 210, back-end block 212, or baseband block 214. Those of ordinary skill in the art in the field of the invention can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the invention, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The present invention can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the present invention pertains.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

We claim:

1. A method for estimating interference power present at a receiver antenna in a communications systems receiver, comprising:
   detecting an interference type signal associated with a received radio signal;
   determining an interference power, measured at baseband, associated with the received radio signal;
   estimating an interference power present at the antenna using the determined baseband interference power and the detected interference type, wherein the step of estimating the interference power present at the antenna comprises:
      interpolating the determined baseband interference power using scaling factors determined by the interference type signal associated with the received radio signal;
   determining carrier power, measured at baseband, associated with the radio signal based on a channel estimate h(k), and further wherein the baseband interference information is based on interference samples I(n);
   determining an average total power for the communications systems receiver at the receiver antenna, wherein the step of determining the average total power for the communications systems receiver at the receiver antenna comprises:
      determining an averaged carrier power at the receiver antenna and an averaged interference power at the receiver antenna, wherein the averaged carrier power is based on an instantaneous carrier power value at the receiver antenna, and the averaged interference power is based on an instantaneous interference power value at the receiver antenna; and
      summing the averaged carrier power and the averaged interference power to obtain the average total power for the communications systems receiver at the receiver antenna;
   determining an automatic gain control (AGC) setting based on the determined average total power, and
   determining a signal-to-noise-plus-interference ratio (SINR), wherein the SINR is equal to the ratio of the average carrier power at the receiver antenna to the average interference power at the receiver antenna.

2. The method according to claim 1, further comprising:
   selecting, in a mobile station in a communications system a RF filter based on the determined SINR, wherein a wideband RF filter is selected in the mobile station when the interference type is one of the sensitivity and co-channel interference types and wherein the wideband RF filter has a bandwidth at least greater than an application specific bandwidth, and further wherein a narrowband RF filter is selected in the mobile station when the interference type is the adjacent channel interference type and wherein the narrowband RF filter has a bandwidth less than the application specific bandwidth.

3. The method according to claim 1, further comprising:
   selecting an equalizer in a mobile station in a communications network based on the determined interference type, wherein
      when the interference type is the sensitivity interference type, using a single antenna equalizer that optimizes SINR performance under thermal noise and no interference conditions in the mobile station, and wherein
      when the interference type is one of the co-channel interference type and adjacent channel interference type, using an interference cancellation equalizer.

4. The method according to claim 3, wherein the single antenna equalizer can be a low complexity single antenna temporal whitening equalizer when the interference type is the sensitivity type of interference.

5. The method according to claim 3, wherein the interference cancellation equalizer can be an equalizer based on an interference rejection combining (IRC) technique or an ST-IRC equalizer.

6. The method according to claim 5, wherein the interference cancellation equalizer can use a single antenna or multiple antennas.

7. The method according to claim 1, wherein the instantaneous values of the interference and carrier powers are equal to the baseband interference power and baseband carrier power, respectively.

8. The method according to claim 1 wherein the step of detecting an interference type signal associated with the radio signal comprises:
   determining a power residue value of sensitivity type interference;
   determining a power residue value of co-channel interference (CCI) type interference;
   determining a power residue value of adjacent channel interference (ACI) type interference; and
   determining the interference type based on which of the sensitivity, CCI and ACI power residue values is a smallest power residue value.

9. The method according to claim 8 further comprising:
   setting a scaling factor $K_I$ equal to $K_{CCI}$ if the interference type is the sensitivity or CCI type, and setting the scaling factor $K_I$ equal to $K_{ACI}$ if the interference type is the ACI type.

10. The method according to claim 9, further comprising:
    calculating an interference power at the antenna according to the equation $$P_{interference} = K_I \times \text{baseband interference power;}$$

and
    calculating a carrier power at the antenna according to the equation $$P_{Carrier} = K_C \times \text{baseband carrier power,}$$

wherein $K_C$ is a carrier power scaling factor.

11. The method according to claim 9, further comprising:
    determining the co-channel interference scaling factor $K_{CCI}$ by
    inputting co-channel interference type interference signals into the antenna of the receiver of the communications system at an injected interference power level;
    calculating baseband interference power from the co-channel interference type interference signals; and
    determining the co-channel interference scaling factor according to the equation $$K_{CCI} = \frac{\text{injected interference power level at antenna}}{\text{calculated baseband interference power}}$$

12. The method according to claim 9, further comprising:
determining the adjacent channel interference scaling factor $K_{ACI}$ by—
inputting adjacent channel interference type interference signals into the antenna of the receiver of the communications system at an injected interference power level;
calculating baseband interference power from the adjacent channel interference type interference signals; and
determining the adjacent channel interference scaling factor according to the equation $$K_{CCI} = \frac{\text{injected interference power level at antenna}}{\text{calculated baseband interference power}}.$$

13. The method according to claim 10, further comprising:
determining the carrier power scaling factor $K_C$ by—
injecting a carrier signal of a known power to the antenna of the receiver, such that substantially no interference signals are present other than thermal noise signals;
calculating the baseband carrier power using the channel estimate according to the equation $$\text{baseband carrier power} = \sum_{L=0}^{L-1} |h(k)|^2,$$

where h(k) is a channel response, and L is a number of channel taps in the receiver of the communications system; and
determining the carrier power scaling factor according to the equation $$K_C = \frac{\text{injected carrier power level at antenna}}{\text{calculated baseband interference power}}.$$

14. The method according to claim 8, further comprising:
calculating a true carrier power at the antenna according to the equation true carrier power=$a_n \times EC^n + a_{n-1} \times EC^{n-1} + \ldots + a_1 \times EC + a_0$, wherein $a_0, a_1 \ldots a_n$ are coefficients which match an estimated carrier power to the true carrier power, wherein EC equals an estimated baseband carrier power, calculated according to the equation $$\text{baseband carrier power} = \sum_{L=0}^{L-1} |h(k)|^2,$$

wherein L is a number of channel taps in the receiver of the communications system; and
estimating the interference power at the antenna using a method of mapping the determined baseband interference power according to one or more of a method of curve fitting, least square, and linear regression, and further wherein the estimated interference power at the antenna is dependent upon the detected type of interference signal.

15. The method according to claim 14, wherein the step of mapping the determined baseband interference power comprises:
determining that the detected type of interference signal is one of a CCI and sensitivity type interference signal; and
calculating a true interference power at the antenna according to the equation True Interference Power(CCI)=$b_{CCI}(n) \times E_I^n + b_{CCI}(n-1) \times E_I^{n-1} + \ldots b_{CCI}(1) \times E_I + b_{CCI}(0)$, wherein $b_{CCI}(0), b_{CCI}(1) \ldots b_{CCI}(n)$ are coefficients for estimating CCI interference power, wherein EI equals an estimated baseband interference power, calculated according to the equation $$\text{baseband interference power} = \sum_n |\hat{I}(n)|^2.$$

16. The method according to claim 14, wherein the step of mapping the determined baseband interference power comprises:
determining that the detected type of interference signal is an ACI type interference signal; and
calculating a true interference power at the antenna according to the equation True Interference Power(ACI)=$b_{ACI}(n) \times E_I^n + \ldots b_{ACI}(n-1) \times E_I^{n-1} + \ldots b_{ACI}(1) \times E_I + b_{ACI}(0)$, wherein $b_{ACI}(0), b_{ACI}(1) \ldots b_{ACI}(n)$ are coefficients for estimating ACI interference power, wherein EI equals an estimated baseband interference power, calculated according to the equation $$\text{baseband interference power} = \sum_n |\hat{I}(n)|^2.$$

17. A receiver in a communications systems, comprising:
an antenna configured to transmit radio signals, and to receive radio signals;
a radio frequency (RF) module coupled to the antenna, wherein the RF module is configured to up-convert communications signals for transmission by the antenna as transmitted radio signals, and to down-convert radio signals received by the antenna, respectively, and wherein down-conversion includes converting the received radio signals into digital signals representative of the received radio signals; and
a digital baseband module, coupled to the RF module, wherein the digital baseband module is configured to receive the digital signals from the RF module, detect an interference type signal associated with the radio signal, determine an interference power, measured at baseband, associated with the radio signal, and estimate an interference power present at the antenna using the determined baseband interference power and the detected interference type, and wherein the digital baseband module is further configured to interpolate the determined baseband interference power using scaling factors determined by the interference type signal associated with the received radio signal, and wherein the digital baseband module is further configured to determine baseband carrier power associated with the received radio signal based on a channel estimate h(k), and further wherein the baseband interference information is based on interference samples I(n), determine an average total power for the communications systems receiver at the antenna, determine an automatic gain control (AGC) setting based on the determined average total power, determine an averaged carrier power at the antenna and an averaged interference power at the antenna, wherein the averaged carrier power is based on an instantaneous carrier power value at the antenna, and the averaged interference power is based on an instantaneous interference power value at the antenna, sum the averaged carrier power and the averaged interference power to obtain the average total power for the communications systems receiver at the antenna, and determine a signal-to-noise-plus-interference ratio (SINR), wherein the SINR is equal to the ratio of the average carrier power at the antenna to the average interference power at the antenna.

18. The receiver according to claim 17, wherein the digital baseband module is further configured to select, in a mobile station in a communications system, an RF filter based on the determined SINR, wherein a wideband RF filter is selected in the mobile station when the interference type is one of the sensitivity and co-channel interference types and wherein the wideband RF filter has a bandwidth at least greater than an application specific bandwidth, and further wherein a narrowband RF filter is selected in the mobile station when the interference type is the adjacent channel interference type and wherein the narrowband RF filter has a bandwidth less than the application specific bandwidth.

19. The receiver according to claim 17, wherein the digital baseband module is further configured to determine a power residue value of sensitivity type interference, determine a power residue value of co-channel interference (CCI) type interference, determine a power residue value of adjacent channel interference (ACI) type interference; and determine the interference type based on which of the sensitivity, CCI and ACI power residue values is a smallest power residue value.

20. The receiver according to claim 19, wherein the digital baseband module is further configured to set a scaling factor $K_I$ equal to $K_{CCI}$ if the interference type is the sensitivity or CCI type, and set the scaling factor $K_I$ equal to $K_{ACI}$ if the interference type is the ACI type, calculate an interference power at the antenna according to the equation $$P_{interference} = K_I \times \text{baseband interference power},$$

and calculate a carrier power at the antenna according to the equation $$P_{Carrier} = K_C \times \text{baseband carrier power},$$

wherein $K_C$ is a carrier power scaling factor.

21. The receiver according to claim 20, wherein the digital baseband module is further configured to determine the co-channel interference scaling factor $K_{CCI}$ by inputting co-channel interference type interference signals into the antenna of the receiver of the communications system at an injected interference power level, calculate baseband interference power from the co-channel interference type interference signals, and determine the co-channel interference scaling factor according to the equation $$K_{CCI} = \frac{\text{injected interference power level at antenna}}{\text{calculated baseband interference power}}.$$

22. The receiver according to claim 20, wherein the digital baseband module is further configured to determine the adjacent channel interference scaling factor $K_{ACI}$ by inputting adjacent channel interference type interference signals into the antenna of the receiver of the communications system at an injected interference power level, calculate baseband interference power from the adjacent channel interference type interference signals, and determine the adjacent channel interference scaling factor according to the equation $$K_{ACI} = \frac{\text{injected interference power level at antenna}}{\text{calculated baseband interference power}}.$$

23. The receiver according to claim 20, wherein the digital baseband module is further configured to determine the carrier power scaling factor $K_C$ by— injecting a carrier signal of a known power to the antenna of the receiver, such that substantially no interference signals are present other than thermal noise signals, calculate the baseband carrier power using the channel estimate according to the equation $$\text{baseband carrier power} = \sum_{L=0}^{L-1} |h(k)|^2,$$

where h(k) is a channel response, and L is a number of channel taps in the receiver of the communications system, and determine the carrier power scaling factor according to the equation $$K_C = \frac{\text{injected interference power level at antenna}}{\text{calculated baseband interference power}}.$$

24. The receiver according to claim 19, wherein the digital baseband module is further configured to calculate a true carrier power at the antenna according to the equation $$\text{true carrier power} = a_n \times EC^n + a_{n-1} \times EC^{n-1} + \ldots + a_1 \times EC + a_0,$$

wherein $a_0, a_1 \ldots a_n$ are coefficients which match an estimated carrier power to the true carrier power, wherein EC equals an estimated baseband carrier power, calculated according to the equation $$\text{baseband carrier power} = \sum_{L=0}^{L-1} |h(k)|^2,$$

wherein L is a number of channel taps in the receiver of the communications system, estimate the interference power at the antenna using a method of mapping the determined baseband interference power according to one or more of a method of curve fitting, least square, and linear regression, and further wherein the estimated interference power at the antenna is dependent upon the detected type of interference signal, and wherein the digital baseband module is further configured to
determine that the detected type of interference signal is one of a CCI and sensitivity type interference signal, and calculate a true interference power at the antenna according to the equation True Interference Power(CCI)=$b_{CCI}(n) \times E_I^n$+
$b_{CCI}(n-1) \times E_I^{n-1}$+ ... $b_{CCI}(1) \times E_I + b_{CCI}(0)$, wherein $b_{CCI}(0)$, $b_{CCI}(1)$ ... $b_{CCI}(n)$ are coefficients for estimating CCI interference power, wherein EI equals an estimated baseband interference power, calculated according to the equation $$\text{baseband interference power} = \sum_n |\hat{I}(n)|^2.$$

25. The receiver according to claim 19, wherein the digital baseband module is further configured to determine that the detected type of interference signal is an ACI type interference signal, and
calculate a true interference power at the antenna according to the equation True Interference Power(ACI)=$b_{ACI}(n) \times E_I^n$+
$b_{ACI}(n-1) \times E_I^{n-1}$+ ... $b_{ACI}(1) \times E_I + b_{ACI}(0)$, wherein $b_{ACI}(0)$, $b_{ACI}(1)$ ... $b_{ACI}(n)$ are coefficients for estimating ACI interference power, wherein EI equals an estimated baseband interference power, calculated according to the equation $$\text{baseband interference power} = \sum_n |\hat{I}(n)|^2.$$

26. A method for estimating interference power present at a receiver antenna in a communications systems receiver, comprising:
   detecting an interference type signal associated with a received radio signal;
   determining an interference power, measured at baseband, associated with the received radio signal;
   estimating an interference power present at the antenna using the determined baseband interference power and the detected interference type, wherein the step of estimating the interference power present at the antenna comprises:
      interpolating the determined baseband interference power using scaling factors;
   determining carrier power, measured at baseband, associated with the radio signal;
   determining an average total power for the communications systems receiver at the receiver antenna, wherein the step of determining the average total power for the communications systems receiver at the receiver antenna comprises:
      determining an averaged carrier power at the receiver antenna and an averaged interference power at the receiver antenna; and
      summing the averaged carrier power and the averaged interference power to obtain the average total power for the communications systems receiver at the receiver antenna;
   determining an automatic gain control (AGC) setting based on the determined average total power, and
   determining a signal-to-noise-plus-interference ratio (SINR), wherein the SINR is equal to the ratio of the average carrier power at the receiver antenna to the average interference power at the receiver antenna.

27. A receiver in a communications system, comprising:
   an antenna configured to transmit radio signals, and to receive radio signals;
   a radio frequency (RF) module coupled to the antenna, wherein the RF module is configured to up-convert communications signals for transmission by the antenna as transmitted radio signals, and to down-convert radio signals received by the antenna, respectively, and wherein down-conversion includes converting the received radio signals into digital signals representative of the received radio signals; and
   a digital baseband module, coupled to the RF module, wherein the digital baseband module is configured to receive the digital signals from the RF module, detect an interference type signal associated with the radio signal, determine an interference power, measured at baseband, associated with the radio signal, and estimate an interference power present at the antenna using the determined baseband interference power and the detected interference type, and wherein the digital baseband module is further configured to interpolate the determined baseband interference power using scaling factors, and wherein the digital baseband module is further configured to
      determine baseband carrier power associated with the received radio signal,
      determine an average total power for the communications systems receiver at the antenna,
      determine an automatic gain control (AGC) setting based on the determined average total power,
      determine an averaged carrier power at the antenna and an averaged interference power at the antenna,
      sum the averaged carrier power and the averaged interference power to obtain the average total power for the communications systems receiver at the antenna, and
      determine a signal-to-noise-plus-interference ratio (SINR), wherein the SINR is equal to the ratio of the average carrier power at the antenna to the average interference power at the antenna.

* * * * *